(12) United States Patent
Saito et al.

(10) Patent No.: US 7,473,034 B2
(45) Date of Patent: Jan. 6, 2009

(54) HYDRODYNAMIC BEARING DEVICE, MOTOR, AND DISK DRIVING APPARATUS

(75) Inventors: Hiroaki Saito, Ehime (JP); Hiroyuki Kiriyama, Ehime (JP); Takao Yoshitsugu, Ehime (JP); Koji Hirata, Ehime (JP)

(73) Assignee: Panasonic Corporation, Osaka (JP)

( * ) Notice: Subject to any disclaimer, the term of this patent is extended or adjusted under 35 U.S.C. 154(b) by 292 days.

(21) Appl. No.: 11/443,175

(22) Filed: May 31, 2006

(65) Prior Publication Data

US 2007/0024136 A1     Feb. 1, 2007

(30) Foreign Application Priority Data

Jul. 28, 2005   (JP)   ............................. 2005-218277

(51) Int. Cl.
    F16C 32/06        (2006.01)
(52) U.S. Cl. .................................................. 384/107
(58) Field of Classification Search ................ 384/100, 384/107, 114, 121, 132
    See application file for complete search history.

(56) References Cited

U.S. PATENT DOCUMENTS

| | | | |
|---|---|---|---|
| 5,558,445 A | | 9/1996 | Chen et al. |
| 5,795,072 A | * | 8/1998 | Hwang ........................ 384/100 |
| 6,066,903 A | * | 5/2000 | Ichiyama .................... 384/107 |
| 6,211,592 B1 | | 4/2001 | Ichiyama |
| 7,133,250 B2 | * | 11/2006 | Herndon et al. .......... 360/99.08 |
| 2004/0184688 A1 | | 9/2004 | Le et al. |
| 2004/0264819 A1 | * | 12/2004 | Weingord et al. ........... 384/107 |
| 2005/0084189 A1 | * | 4/2005 | Oelsch ........................ 384/107 |
| 2006/0029312 A1 | * | 2/2006 | Kiryama et al. ............. 384/107 |

FOREIGN PATENT DOCUMENTS

| | | |
|---|---|---|
| JP | 2000-350408 | 12/2000 |
| JP | 2004-286212 | 10/2004 |

* cited by examiner

*Primary Examiner*—Thomas R Hannon
(74) *Attorney, Agent, or Firm*—Wenderoth, Lind & Ponack, L.L.P.

(57) ABSTRACT

A hydrodynamic bearing device with high reliability, with which reductions in size, weight, and thickness can be achieved, as well as a motor and a disk driving apparatus that make use of this hydrodynamic bearing device. The hydrodynamic bearing device comprises a shaft, a thrust flange, a sleeve, a seal plate, and a retaining plate. A radial dynamic pressure bearing is formed in the radial direction gap between the shaft and the sleeve, and a thrust dynamic pressure bearing is formed in the thrust dynamic bearing gap between the sleeve and the thrust flange. A communicating hole is formed for communicating between the gap between the sleeve and the seal plate and the thrust direction gap between the sleeve and the thrust flange. The radial dynamic pressure bearing and/or the thrust dynamic pressure bearing are formed such that a lubricating oil circulates in the gap between the sleeve and the seal plate from the inner peripheral side of the sleeve toward the outer peripheral side.

18 Claims, 18 Drawing Sheets

HYDRODYNAMIC BEARING DEVICE, MOTOR, AND DISK DRIVING APPARATUS

CROSS-REFERENCE TO RELATED APPLICATIONS

This application claims priority to Japanese Patent Application No. 2005-218277. The entire disclosure of Japanese Patent Application No. 2005-218277 is hereby incorporated herein by reference.

BACKGROUND OF THE INVENTION

1. Field of the Invention

The present invention relates to a hydrodynamic bearing device, a motor, and a disk driving apparatus, and more particularly relates to a hydrodynamic bearing device that utilizes the dynamic pressure of a fluid and is used, for example, in a motor for rotationally driving a disk-shaped recording medium, and to a motor and a disk driving apparatus in which this hydrodynamic bearing device is used.

2. Background Information

Recent years have seen the data transfer rate rise along with memory capacity in disk driving apparatuses in which a disk-shaped recording medium such as a magnetic disk, optical disk, or opto-magnetic disk is rotationally driven. Accordingly, a hydrodynamic bearing device with which a shaft that is rotationally driven at high speed can be maintained at high precision is used for the bearing devices of motors used in this kind of disk driving apparatus.

With a typical hydrodynamic bearing device, the space between the outer peripheral face of a shaft and the inner peripheral face of a holding component for holding this shaft is filled with a lubricating oil that serves as a working fluid, dynamic pressure is generated by a herringbone groove formed in the outer peripheral face of the shaft or the inner peripheral face of the holding component, and this forms a radial bearing that supports the load of the rotating body in the radial direction during rotation. Lubricating oil also fills the space between the holding component and a disk-shaped thrust plate affixed to the end of the shaft, dynamic pressure is generated by a spiral groove formed in any opposing faces of the thrust plate and the holding component, and this forms a thrust bearing that supports the load of the rotating body in the axial direction during rotation.

A hydrodynamic bearing device that has already been proposed will be described in specific terms through reference to FIG. 17. FIG. 17 is a cross section illustrating the structure of a motor for a disk driving apparatus in which the hydrodynamic bearing device disclosed in Japanese Laid-Open Patent Application 2000-350408 is used.

In FIG. 17, the proposed disk driving apparatus motor is equipped with a rotor hub 2 on which a magnetic disk or other such disk-shaped recording medium 1 (hereinafter referred to as "disk 1") is mounted, a shaft 3 provided passing through the rotor hub 2 in the axial direction, a base 4 that fixes the shaft 3 and supports a core 5 of a motor stator, and a rotor magnet 6 that is disposed across from the core 5 and fixed to the rotor hub 2. A herringbone groove is formed in the outer peripheral face of the shaft 3 or the inner peripheral face of the rotor hub 2, and a spiral groove is formed on the lower face of the rotor hub 2 or the upper face of the base 4. A lubricating oil 7 fills the tiny space between the opposing faces of the rotor hub 2 and the shaft 3, and this forms a radial bearing. The lubricating oil 7 also fills the tiny space between the opposing faces of the rotor hub 2 and the base 4, and this forms a thrust bearing.

As shown in FIG. 17, a cutout 3a is formed in the upper end of the shaft 3, and an annular plate 8 protruding in the radial direction from the outer peripheral face of the shaft 3 is affixed to this cutout 3a. This plate 8 is disposed corresponding to a stepped portion 2a of the rotor hub 2, and has the function of keeping the rotor hub 2 from coming off.

With the proposed disk driving apparatus motor that makes use of a hydrodynamic bearing device constituted as above, when the drive component constituted by the core 5 and the rotor magnet 6 is excited, this causes the rotor hub 2 on which the disk 1 is mounted to rotate, and the bearing functions of the radial bearing and thrust bearing are realized. Specifically, when electrical power is sent to the core 5, the rotor hub 2 rotates with respect to the shaft 3 and the base 4, in the thrust bearing the lubricating oil 7 between the lower face of the hub 2 and the upper face of the base 4 generates dynamic pressure, which supports the load in the thrust direction, and in the radial bearing the lubricating oil 7 between the outer peripheral face of the shaft 3 and the inner peripheral face of the hub 2 generates dynamic pressure, which supports the load in the radial direction.

The hydrodynamic bearing device shown in FIG. 18 is also known. FIG. 18 is a cross section illustrating the structure of a motor for a disk driving apparatus in which the hydrodynamic bearing device disclosed in U.S. Pat. No. 5,558,445 is used.

The spindle assembly 10 shown in FIG. 18 is primarily made up of a base 12, a shaft 14 fixed to the base 12, an annular upper thrust bearing plate 28 fixed to the upper end side of the shaft 14, an annular lower thrust bearing plate 30 fixed to the lower end side of the shaft 14, a shaft housing (sleeve) 16 mounted rotatably around the outside of the shaft 14, a spindle hub 18 fixed to the outer peripheral side of the shaft housing 16, an annular magnet 31 and a flux circulation ring 33 that are mounted on the spindle hub 18, and a stator assembly 29 fixed to the base 12 across from the annular magnet 31 in the radial direction. With this spindle assembly 10, the shaft 14 and the shaft housing 16 are across from each other in the radial direction, forming radial bearings 34 and 36. Also, the upper and lower thrust plates are across from each other in the thrust direction, forming thrust bearings 40 and 42.

Electronic devices provided with disk driving apparatuses today are tending to be smaller, lighter, and thinner, and this trend is particularly pronounced in portable electronic devices. As a result, reducing the size, weight, and thickness of motors for disk driving apparatuses used in these electronic devices is an important goal in this field. Therefore, reducing the size, weight, and thickness is also something to be achieved in hydrodynamic bearing devices used as the bearing devices in these motors for disk driving apparatuses.

With the proposed disk driving apparatus motor featuring a hydrodynamic bearing device shown in FIG. 17, the base 4, which is thick because it is used to fix the shaft 3, is provided on the lower side of the rotor hub 2 on which the disk 1 is mounted. The annular plate 8 fixed to the shaft 3 must be attached to keep the rotor hub 2 from coming off. Thus, the proposed disk driving apparatus motor makes use of a base 3 that is thick so that the lower end of the shaft 3 can be affixed in an opening in the base 4, and enough space has to be ensured so that the retaining plate can be installed. These requirements, however, are contrary to the goal of reducing the size, weight, and thickness of a hydrodynamic bearing device and a disk driving apparatus motor. Furthermore, with the disk driving apparatus motor shown in FIG. 17, the bearing can be completed and its characteristics evaluated only after the base 4, the shaft 3, the hub 2, and the plate 8 have been assembled and oil added, so the oil filling equipment is expected to end up being large and the yield low.

With the disk driving apparatus motor featuring a hydrodynamic bearing device shown in FIG. 18, since the annular upper thrust bearing plate 28 and the annular lower thrust bearing plate 30 are disposed in the axial direction, and a radial bearing is provided between these thrust bearing plates, it is difficult to keep the structure thin while still ensuring adequate radial bearing performance.

It is an object of the present invention to provide a hydrodynamic bearing device with high reliability, with which reductions in size, weight, and thickness can be achieved, as well as a motor and a disk driving apparatus that make use of this hydrodynamic bearing device. It is a further object to effectively discharge bubbles and smoothly circulate the lubricating fluid in a bearing structure proposed for the sake of reducing size.

SUMMARY OF THE INVENTION

The hydrodynamic bearing device pertaining to a first constitution comprises a shaft, a thrust flange, a sleeve, a sealing means, and a retaining means. The thrust flange is a member that is larger in diameter than the shaft and is provided near one end of the shaft. The sleeve is capable of relative rotation with respect to the shaft and the thrust flange, and has an inner peripheral face that is across from the outer peripheral face of the shaft in the radial direction with a first gap therebetween, and a first axial direction face that is across from a first opposing face of the thrust flange in the axial direction with a second gap therebetween. The sealing means is provided so as to be capable of rotating integrally with the sleeve, across from a second axial direction face located on the opposite side from the first axial direction face of the sleeve, in the axial direction with a third gap therebetween. The retaining means is provided so as to be capable of rotating integrally with the sleeve, across from a second opposing face located on the opposite side from the first opposing face of the thrust flange in the axial direction. At least one communicating passage is provided for communicating between the second gap and the third gap. A lubricating fluid is held in the first gap, the second gap, the third gap, and the communicating passage. A radial dynamic bearing is formed in the first gap. A thrust dynamic bearing is formed in the second gap. The radial dynamic bearing and/or the thrust dynamic bearing is formed such that the lubricating fluid in the third gap circulates from the inner peripheral side toward the outer peripheral side of the sleeve.

The hydrodynamic bearing device of the present invention constituted as above is a device with high reliability, with which reductions in size, weight, and thickness can be achieved.

The hydrodynamic bearing device pertaining to the second constitution is the first constitution, further comprising a hub that has an inner peripheral face fixed to the outer peripheral face of the sleeve, at one end of which is integrally formed the retaining means, and at the other end of which is fixed to the sealing means.

The hydrodynamic bearing device pertaining to the third constitution is the first constitution, further comprising a hub that has an inner peripheral face fixed to the outer peripheral face of the sleeve, at one end of which is provided the retaining means, and at the other end of which is fixed the sealing means. A cutout extending in the axial direction is formed on the outer peripheral face and/or the inner peripheral face of the sleeve. The communicating passage is formed by the cutout and the other face across from the cutout in the radial direction.

The hydrodynamic bearing device pertaining to the fourth constitution is any of the first to third constitutions, wherein a radial dynamic pressure generation groove is formed on the outer peripheral face of the shaft and/or the inner peripheral face of the sleeve that are across from each other via the first gap so that the lubricating fluid in the first gap will circulate from the second gap side toward the third gap side.

The hydrodynamic bearing device pertaining to the fifth constitution is the fourth constitution, wherein the radial dynamic pressure generation groove has an asymmetric herringbone shape in which the groove length on the second gap side is formed longer than the groove length on the third gap side.

The hydrodynamic bearing device pertaining to the sixth constitution is any of the first to third constitutions, wherein the outer peripheral face of the shaft and/or the inner peripheral face of the sleeve that are across from each other via the first gap includes a inclined face that is inclined such that the size of the first gap in the radial direction increases from the second gap side toward the third gap side.

The hydrodynamic bearing device pertaining to the seventh constitution is any of the first to sixth constitutions, wherein a thrust dynamic pressure generation groove is formed on the first opposing face of the thrust flange and/or the first axial direction face of the sleeve that are across from each other via the second gap so that the lubricating fluid in the second gap will circulate from the outer peripheral side toward the inner peripheral side of the second gap.

The hydrodynamic bearing device pertaining to the eighth constitution is the seventh constitution, wherein the thrust dynamic pressure generation groove has a spiral shape.

The hydrodynamic bearing device pertaining to the ninth constitution is the seventh constitution, wherein the thrust dynamic pressure generation groove has an asymmetric herringbone shape in which the groove length on the outer peripheral side is formed longer than the groove length on the inner peripheral side.

The hydrodynamic bearing device pertaining to the tenth constitution is the seventh constitution, wherein the communicating passage opens into the second gap at a location that overlaps at least part of the region where the thrust dynamic pressure generation groove is formed.

The hydrodynamic bearing device pertaining to the eleventh constitution comprises a shaft, a thrust flange, and a sleeve. The thrust flange is a member that is larger in diameter than the shaft and is provided near one end of the shaft. The sleeve is capable of relative rotation with respect to the shaft and the thrust flange, and has an inner peripheral face that is across from the outer peripheral face of the shaft in the radial direction with a first gap therebetween, and a first axial direction face that is across from a first opposing face of the thrust flange in the axial direction with a second gap therebetween. At least one communicating passage is provided for communicating between the two axial direction ends of the sleeve. A lubricating fluid is held in the first gap, the second gap, and the communicating passage. A radial dynamic bearing is formed in the first gap. A thrust dynamic bearing is formed in the second gap. The radial dynamic bearing and/or the thrust dynamic bearing is formed such that the lubricating fluid circulates from the second gap toward the first gap of the sleeve. The communicating passage opens into the second gap at a location that overlaps at least part of the region where the thrust dynamic pressure generation groove is formed in at least any of the faces across from each other with the second gap therebetween.

The motor pertaining to the twelfth constitution comprises a shaft, a thrust flange, a base, a sleeve, a sealing means, a retaining means, a rotor, and a stator. The thrust flange is a member that is larger in diameter than the shaft and is provided near one end of the shaft. The base is fixed to one end of the shaft. The sleeve is capable of relative rotation with respect to the shaft and the thrust flange, and has an inner peripheral face that is across from the outer peripheral face of the shaft in the radial direction with a first gap therebetween, and a first axial direction face that is across from a first opposing face of the thrust flange in the axial direction with a second gap therebetween. The sealing means is provided so as to be capable of rotating integrally with the sleeve, across from a second axial direction face located on the opposite side from the first axial direction face of the sleeve, in the axial direction with a third gap therebetween. The retaining means is provided so as to be capable of rotating integrally with the sleeve, across from a second opposing face located on the opposite side from the first opposing face of the thrust flange in the axial direction. The rotor is substantially fixed to the sleeve. The stator is disposed on the base at a location across from the rotor in the radial direction. At least one communicating passage is provided for communicating between the second gap and the third gap. A lubricating fluid is held in the first gap, the second gap, the third gap, and the communicating passage. A radial dynamic bearing is formed in the first gap. A thrust dynamic bearing is formed in the second gap. The radial dynamic bearing and/or the thrust dynamic bearing is formed such that the lubricating fluid in the third gap circulates from the inner peripheral side toward the outer peripheral side of the sleeve.

The motor of the present invention constituted as above is a device with high reliability, with which reductions in size, weight, and thickness can be achieved.

The motor pertaining to the thirteenth constitution comprises a shaft, a thrust flange, a base, a sleeve, a rotor and a stator. The thrust flange is a member that is larger in diameter than the shaft and is provided near one end of the shaft. The base is fixed to one end of the shaft. The sleeve is capable of relative rotation with respect to the shaft and the thrust flange, and has an inner peripheral face that is across from the outer peripheral face of the shaft in the radial direction with a first gap therebetween, and a first axial direction face that is across from a first opposing face of the thrust flange in the axial direction with a second gap therebetween. The rotor is substantially fixed to the sleeve. The stator is disposed on the base at a location across from the rotor in the radial direction. At least one communicating passage is provided for communicating between the two axial direction ends of the sleeve. A lubricating fluid is held in the first gap, the second gap, and the communicating passage. A radial dynamic bearing is formed in the first gap. A thrust dynamic bearing is formed in the second gap. The radial dynamic bearing and/or the thrust dynamic bearing is formed such that the lubricating fluid circulates from the second gap toward the first gap of the sleeve. The communicating passage opens into the second gap at a location that overlaps at least part of the region where the thrust dynamic pressure generation groove is formed in at least any of the faces across from each other with the second gap therebetween.

The disk driving apparatus pertaining to the fourteenth constitution comprises a shaft, a thrust flange, a base, a sleeve, a hub, a sealing means, a retaining means, a rotor, and a stator. The thrust flange is a member that is larger in diameter than the shaft and is provided near one end of the shaft. The base fixed to one end of the shaft. The sleeve is capable of relative rotation with respect to the shaft and the thrust flange, and has an inner peripheral face that is across from the outer peripheral face of the shaft in the radial direction with a first gap therebetween, and a first axial direction face that is across from a first opposing face of the thrust flange in the axial direction with a second gap therebetween. The hub is fixed to the outer peripheral face of the sleeve, on which a disk-shaped recording medium is mounted. The sealing means is provided to the hub, across from a second axial direction face located on the opposite side from the first axial direction face of the sleeve, in the axial direction with a third gap therebetween.

The retaining means is provided to the hub, across from a second opposing face located on the opposite side from the first opposing face of the thrust flange in the axial direction. The rotor is fixed to the hub. The stator is disposed on the base at a location across from the rotor in the radial direction. At least one communicating passage is provided for communicating between the second gap and the third gap. A lubricating fluid is held in the first gap, the second gap, the third gap, and the communicating passage. A radial dynamic bearing is formed in the first gap. A thrust dynamic bearing is formed in the second gap. The radial dynamic bearing and/or the thrust dynamic bearing is formed such that the lubricating fluid in the third gap circulates from the inner peripheral side toward the outer peripheral side of the sleeve.

The disk driving apparatus of the present invention constituted as above is a device with high reliability, with which reductions in size, weight, and thickness can be achieved.

The disk driving apparatus pertaining to the fifteenth constitution comprises a shaft, a thrust flange, a base, a sleeve, a hub, a rotor, and a stator. The thrust flange is a member that is larger in diameter than the shaft and is provided near one end of the shaft. The base is fixed to one end of the shaft. The sleeve is capable of relative rotation with respect to the shaft and the thrust flange, and has an inner peripheral face that is across from the outer peripheral face of the shaft in the radial direction with a first gap therebetween, and a first axial direction face that is across from a first opposing face of the thrust flange in the axial direction with a second gap therebetween. The hub is fixed to the outer peripheral face of the sleeve, on which a disk-shaped recording medium is mounted. The rotor is fixed to the hub. The stator is disposed on the base at a location across from the rotor in the radial direction. At least one communicating passage is provided for communicating between the two axial direction ends of the sleeve. A lubricating fluid is held in the first gap, the second gap, and the communicating passage. A radial dynamic bearing is formed in the first gap. A thrust dynamic bearing is formed in the second gap. The radial dynamic bearing and/or the thrust dynamic bearing is formed such that the lubricating fluid circulates from the second gap toward the first gap of the sleeve. The communicating passage opens into the second gap at a location that overlaps at least part of the region where the thrust dynamic pressure generation groove is formed in at least any of the faces across from each other with the second gap therebetween.

The present invention provides a hydrodynamic bearing device that has high reliability, is well suited to mass production, and affords high working efficiency, with which reduction in size, weight, and thickness can be achieved, as well as a motor and a disk driving apparatus that make use of this hydrodynamic bearing device.

Also, with the hydrodynamic bearing device, motor, and disk driving apparatus pertaining to the present invention, a seal plate is provided at the upper part of the sleeve to form an oil reservoir, allowing adequate lubricating oil to be supplied during rotational operation. Also, if this oil reservoir is vented by having it communicate with the outside of the bearing, for example, any bubbles generated during rotation can be discharged. Also, a communicating passage is formed that communicates between the oil reservoir and the thrust dynamic bearing, the pressure of the thrust dynamic bearing can be adjusted, and any bubbles produced in the thrust dynamic bearing can be eliminated. Therefore, with the present invention, the first characteristics of the bearing portion are stable, and this in turn results in a longer service life for the bearing portion.

Also, when the sleeve rotates, centrifugal force is generated in the oil reservoir which moves the relatively heavy lubricating fluid to the outer peripheral side and moves the relatively light air to the inner peripheral side, but with the present invention, the direction of this centrifugal force in the oil reservoir matches the direction in which the lubricating fluid circulates in the oil reservoir, and the centrifugal force is utilized more effectively, so any bubbles generated by the thrust bearing and radial bearing are discharged through the gap between the inner peripheral face of the seal plate and the outer peripheral face of the shaft, after which they move under centrifugal force and the pumping force of the bearings toward the oil reservoir, which has low passage resistance, which means that the above-mentioned problem of gas/liquid separation can be prevented. Accordingly, it is possible to prevent separated air from getting into the bearing components, which would otherwise cause oil starvation, and bearing performance can be stabilized.

Also, since the lubricating fluid circulates inside the bearings, this configuration is less prone to scattering of the lubricating fluid. Furthermore, the sealing means maintains a good seal around the insides of the bearings. These also prevent oil starvation from occurring in the bearing components, for example, and stabilize bearing performance.

Also, with the motor and disk driving apparatus pertaining to the present invention, the shaft is fixed to the base. This means that even when a load is applied in the thickness direction, the shaft will be able to support this load, which ensures good toughness for the device as a whole. Furthermore, since one end of the shaft is fixed to the base, the other end can be fixed to a housing or the like, for example. Thus fixing both ends allows the required mechanical rigidity to be achieved in the shaft even when the shaft diameter is reduced, and this minimizes the amount of disk displacement caused by vibration or impact, and contributes to higher recording density on the recording disk. Also, since the shaft diameter can be reduced when both ends are fixed, there is a reduction in loss attributable to the bearing, and current consumption can be decreased.

Furthermore, if the retaining means is formed integrally with the hub as in the second invention, then the hydrodynamic bearing device, motor, or disk driving apparatus can be made up of fewer parts. This affords a reduction in manufacturing costs and manufacturing steps.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Preferred embodiments of the hydrodynamic bearing device pertaining to the present invention, and of a disk driving apparatus motor that makes use of this hydrodynamic bearing device, will now be described through reference to the appended drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
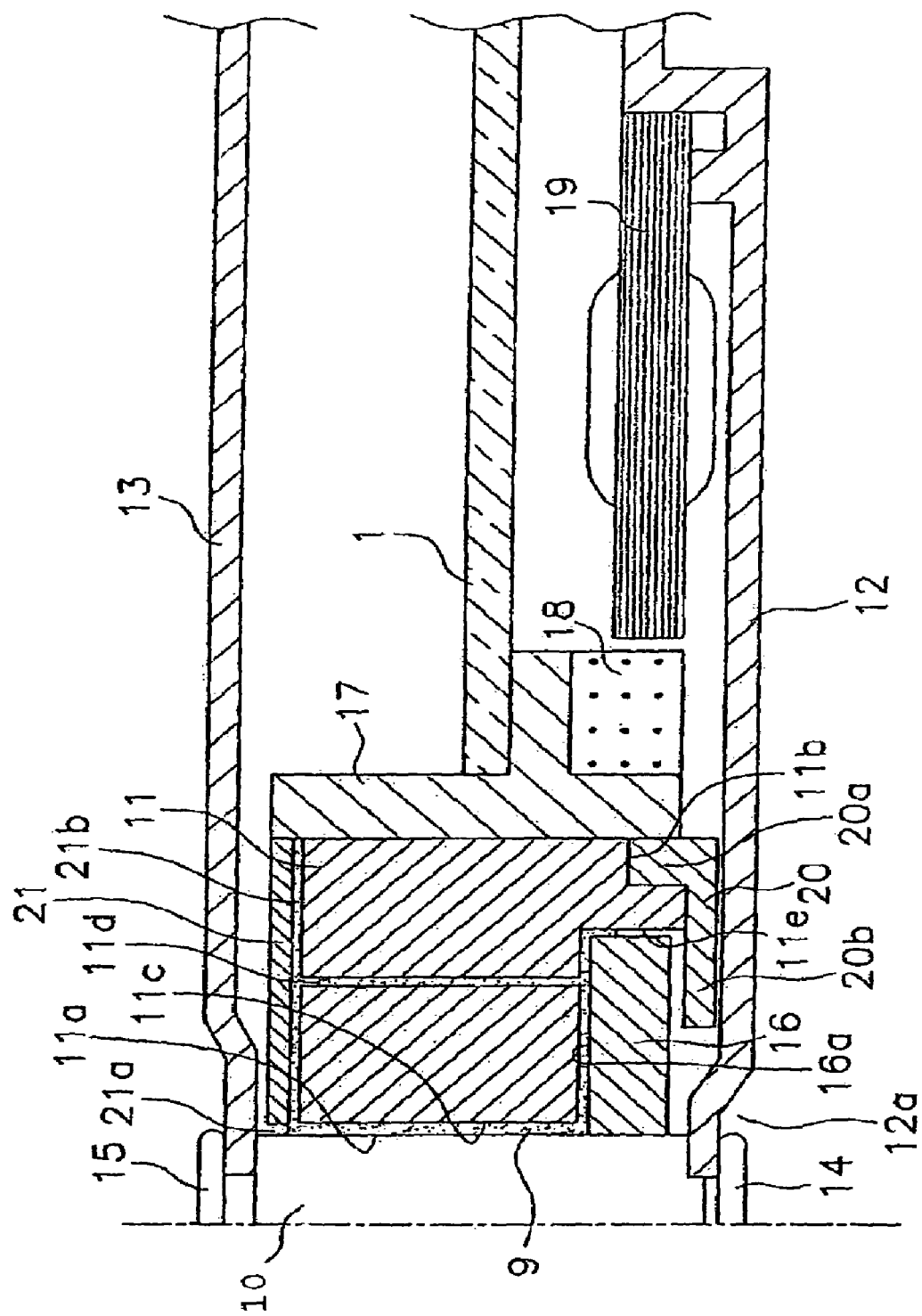
FIG. 1 is a cross section of a disk driving apparatus motor that makes use of a hydrodynamic bearing device in a first embodiment pertaining to the present invention.

A disk driving apparatus motor that makes use of the hydrodynamic bearing device of a first embodiment pertaining to the present invention will be described through reference to FIG. 1. FIG. 1 is a cross section of the structure of a disk driving apparatus motor that makes use of the hydrodynamic bearing device in the first embodiment. The hydrodynamic bearing device of the first embodiment is substantially in left-right symmetric, and the cross section in FIG. 1 shows the right half.

Overall Structure

In FIG. 1, a shaft 10 is relatively rotatably inserted in a bearing hole 11a of a sleeve 11. A disk-shaped thrust flange 16 that extends perpendicular to the center axis is provided on the lower side of the shaft 10. The thrust flange 16 is housed in a recess 11e formed in the sleeve 11, and is designed to support the rotating sleeve 11. The lower end of the shaft 10 is fixed to a base 12 by a screw 14, and a cover 13 is attached to the upper end of the shaft 10 by a screw 15.

A rotor hub 17, on which a magnetic disk, optical disk, opto-magnetic disk, or other such disk-shaped recording medium 1 (hereinafter referred to as "disk 1") is mounted, is affixed to the outer peripheral face of the sleeve 11. A rotor magnet 18 is affixed to the lower side (the direction in which the base 12 is provided is termed the downward direction) of the disk 1 mounted on the rotor hub 17, and this rotor magnet 18 is disposed across from a core 19, which is the stator of the motor, affixed to the base 12.

As shown in FIG. 1, a stepped portion 11b is formed on the lower side of the outer peripheral portion of the sleeve 11, and a retaining plate 20, which is an annular retaining means whose cross section bends at approximately 90 degrees, is affixed to this stepped portion 11b. Specifically, the upwardly protruding portion 20a of the retaining plate 20 is disposed at and affixed to the stepped portion 11b of the sleeve 11, and the remaining portion 20b of the retaining plate 20 protrudes to the shaft side. As a result, the portion 20b of the retaining plate 20 that protrudes to the shaft side is located across from the lower face of the thrust flange 16.

With the hydrodynamic bearing device of the first embodiment, the base 12 is formed by stamping from a thin metal sheet, such as a steel sheet of about 0.3 mm (thickness). A step is formed in the portion of the base 12 affixed to the shaft 10, and this step serves as a reinforcing rib 12a. Thus providing the reinforcing rib 12a to the base 12 increases the rigidity of the base 12, and also prevents the screw head from protruding beyond the lower face of the base 12 when the base 12 is fixed to the shaft 10 by the screw 14. Therefore, the hydrodynamic bearing device of the first embodiment constituted as above has a simple external shape, and can be designed for easy assembly into the device.

Also, with the hydrodynamic bearing device of the first embodiment, if the reinforcing rib 12a is formed by bending the base 12 made of a metal sheet, a space will be formed inside the device, which is the upper face side of the base 12. In this space is disposed the portion 20b of the retaining plate 20 that protrudes to the shaft side. As a result, with the constitution of the first embodiment, the space formed by the reinforcing rib 12a of the base 12 serves as the space in which the retaining plate 20 is disposed, which means that the various members can be disposed more efficiently in the internal space of the hydrodynamic bearing device, and this affords a reduction in size and thickness.

With the hydrodynamic bearing device in the first embodiment, a dynamic pressure generation groove 11c is formed in the inner peripheral face of the bearing hole 11a of the sleeve 11. A dynamic pressure generation groove 16a is formed in the upper face of the thrust flange 16, on the opposite face from the sleeve 11. A lubricating oil 9 is held as a working fluid (lubricating fluid) in the gap made up by the opposing faces of the shaft 10 and the sleeve 11, and in the gap made up by the opposing faces of the thrust flange 16 and the sleeve 11.

With the hydrodynamic bearing device in the first embodiment, the example described was one in which the dynamic pressure generation groove 11c was formed in the inner peripheral face of the bearing hole 11a of the sleeve 11, but the present invention is not limited to this configuration, and a dynamic pressure generation groove may instead be formed in the outer peripheral face of the shaft 10 across from the bearing hole 11a. Also, the dynamic pressure generation groove 16a was formed in the thrust flange 16 in the opposite face from the sleeve 11, but a dynamic pressure generation groove may instead be formed in the sleeve 11 in the opposite face from the thrust flange 16.

As discussed above, a radial dynamic pressure generation means is constituted by the dynamic pressure generation groove 11c formed in the opposing faces of the shaft 10 and the sleeve 11, and a thrust dynamic pressure generation means is constituted by the dynamic pressure generation groove 16a formed in the opposing faces of the thrust flange 16 and the sleeve 11.

The detailed bearing structure will be described below in the section titled "Bearing Structure."

A seal plate 21 is disposed at a location across from the upper end face of the sleeve 11 (the face perpendicular to the rotational axis), and this seal plate 21 is affixed to the inner peripheral face of the rotor hub 17. The inner peripheral end face of the seal plate 21 and the outer peripheral face of the shaft 10 are a specific distance apart, and this forms an opening 21a. Therefore, the seal plate 21 is provided with a specific gap (such as a gap of from 0.02 to 0.1 mm) away from the upper end face of the sleeve 11, so as to cover the upper end face of the sleeve 11. At least one communicating hole 11d extended parallel to the rotational axis is formed in the sleeve 11. The communicating hole 11d allows the gap between the sleeve 11 and the seal plate 21 to communicate with the gap between the sleeve 11 and the thrust flange 16. Specifically, the communicating hole 11d is formed so as to allow communication between the upper end face of the sleeve 11 and the opposite face from the thrust flange 16 (the face perpendicular to the rotational axis). Here, the face of the sleeve 11 across from the thrust flange 16 is the first opposing face, and the upper end face is the second opposing face.

A gap of a specific distance is formed in the seal plate 21 provided as above, between the lower face of the seal plate 21 and the upper end face of the sleeve 11, which forms an oil reservoir 21b that functions as a reservoir for the lubricating oil 9. Also, since the inner peripheral end face of the seal plate 21 forms the opening 21a at a specific distance from the outer peripheral face of the shaft 10, the seal plate 21 functions to discharge to the atmosphere any bubbles from the lubricating oil 9 (the lubricating fluid). A capillary seal may be formed on the inner peripheral end face of the seal plate 21 here. Furthermore, since the oil reservoir 21b constituted by the sleeve 11 and the seal plate 21 communicates with the thrust bearing constituted by the opposing faces of the sleeve 11 and the thrust flange 16, it functions to adjust the pressure of the thrust bearing.

Bearing Structure

The dynamic pressure generation groove 11c formed in the inner peripheral face of the bearing hole 11a of the sleeve 11, and the dynamic pressure generation groove 16a formed in the upper face of the thrust flange 16 across from the sleeve 11, are characterized as follows. The dynamic pressure generation grooves 11c and 16a are each formed such that the lubricating oil 9 in the oil reservoir 21b circulates from the inner peripheral side of the sleeve 11 toward the outer peripheral side.

More specifically, the dynamic pressure generation groove 11c constituting the thrust bearing is in the form of the asymmetric herringbone dynamic pressure groove shown in FIG.

2. The dynamic pressure generation groove 11c is made up of lower grooves that angle downward in the rotation direction of the sleeve 11 (to the left in FIG. 2), and generate pressure for moving the lubricating oil 9 upward in the axial direction when there is relative rotation between the sleeve 11 and the shaft 10, and upper grooves that angle upward in the rotation direction of the sleeve 11, and generate pressure for moving the lubricating oil 9 downward in the axial direction when there is relative rotation between the sleeve 11 and the shaft 10. The length of the lower grooves is set longer than the length of the upper grooves. As a result, when there is relative rotation between the sleeve 11 and the shaft 10, the dynamic pressure generation groove 11c generates a circulation force for circulating the lubricating oil from the thrust flange 16 side toward the seal plate 21 side. With this embodiment, the radial bearing has a single configuration in order to reduce the thickness.

Figure 3:
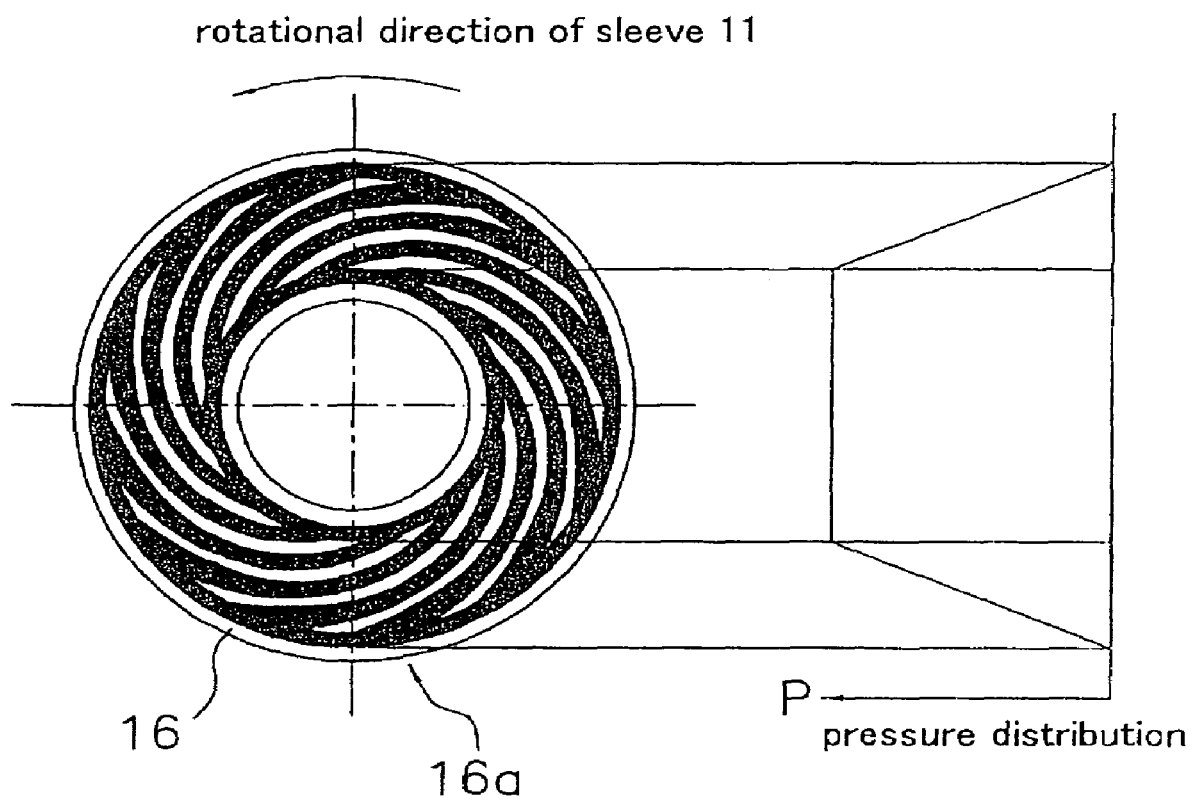
FIG. 3 is a diagram of the structure of a thrust bearing in the first embodiment pertaining to the present invention.

The dynamic pressure generation groove 16a constituting the thrust bearing is in the form of the spiral dynamic pressure groove shown in FIG. 3. The dynamic pressure generation groove 16a is made up of a plurality of grooves that extend in the rotational direction of the sleeve 11 (counterclockwise in FIG. 3) from the outer peripheral side to the inner peripheral side, and whose radius of curvature decreases toward the inner peripheral side. As a result, when there is relative rotation between the sleeve 11 and the thrust flange 16, the dynamic pressure generation groove 16a generates a circulation force for circulating the lubricating oil 9 from the outer peripheral side of the thrust flange 16 toward the inner peripheral side.

With the oil reservoir 21b, the lubricating oil 9 held in the oil reservoir 21b is subject to centrifugal force (see FIG. 1). Accordingly, a circulation force that circulates the lubricating oil 9 from the inner peripheral side of the oil reservoir 21b toward the outer peripheral side is exerted on the lubricating oil 9.

Furthermore, the oil reservoir 21b communicates via the communicating hole 11d with the gap between the thrust flange 16 and the sleeve 11 in which the thrust bearing is formed, and the lubricating oil 9 circulating toward the outer peripheral side in the oil reservoir 21b goes into the communicating hole 11d and is discharged from the communicating hole 11d by the circulation force to the inner peripheral side in the thrust bearing.

Since the passage from the communicating hole 11d toward the gap formed between the thrust flange 16 and the sleeve 11 (the second gap) narrows rapidly, air bubbles tend to accumulate in this portion. It was found that this has a detrimental effect on bearing characteristics. Therefore, the communicating hole 11d is disposed or formed such that the opening thereof on the thrust flange 16 side opens at a location that overlaps at least part of the region where the dynamic pressure generation groove 16a is formed on the thrust flange 16 in which the thrust bearing is formed. Accordingly, the lubricating oil 9 inside the communicating hole 11d is subjected to sufficient suction force by the circulation force generated by the dynamic pressure generation groove of the thrust bearing, and this increases the circulation force exerted on the lubricating oil 9 inside the communicating hole 11d as well.

The range of the opening of the communicating hole 11d referred to here includes the machined part of the end face when the end face has undergone machining such as chamfering of the opening. The "region in which the dynamic pressure generation groove 16a is formed" also includes the portion at the groove-shaped ends where the groove depth gradually changes toward the deepest part.

With the above bearing structure, when there is relative rotation between the sleeve 11 and the shaft 10 or the thrust flange 16, the lubricating oil 9 circulates as follows. Specifically, the lubricating oil 9 moves through the radial bearing from the thrust flange 16 side to the seal plate 21 side, moves through the oil reservoir 21b from the inner peripheral side to the outer peripheral side, moves through the communicating hole 11d from the seal plate 21 side to the thrust flange 16 side, and moves through the thrust bearing from the outer peripheral side to the inner peripheral side.

The above structure has the following effects. With the bearing of this embodiment, the dynamic pressure generation groove 11c that constitutes a radial bearing, and the dynamic pressure generation groove 16a that constitutes a thrust bearing are provided, and this makes it possible to obtain sufficient bearing stiffness. Also, a circulation force is exerted on the lubricating oil 9 by these bearings. Therefore, a bearing with a powerful circulation force and no oil starvation can be obtained. This means that a spindle motor that has high reliability and is suited to a thin configuration can be provided.

Also, with the oil reservoir 21b, the direction in which the centrifugal force acts on the lubricating oil 9 is the same as the circulation force of the lubricating oil 9, so it is possible to prevent oil starvation in the bearings, and it is also possible to increase the circulation force by utilizing this centrifugal force.

Operation

The operation of a disk driving apparatus that makes use of the hydrodynamic bearing device of the first embodiment constituted as above will be described.

In FIG. 1, when power is sent to the core 19 (the stator of the motor), a rotary magnetic field is generated, and the rotor magnet 18, the rotor hub 17, and the sleeve 11 begin to rotate. At this point the lubricating oil 9 is subjected to pumping pressure by the dynamic pressure generation groove 11c (radial bearing) formed in the bearing hole 11a of the sleeve 11 and the dynamic pressure generation groove 16a (thrust bearing) formed on the upper face of the thrust flange 16, which causes the sleeve 11 to lift up from the upper face of the thrust flange 16 and be supported in the radial direction at the desired gap with respect to the outer peripheral face of the shaft 10. Accordingly, the rotating body made up of the sleeve 11, the rotor hub 17, the rotor magnet 18, the retaining plate 20, the seal plate 21, and the disk 1 rotates in a state of non-contact with the shaft 10 and the thrust flange 16.

The shaft 10 rotates while being lubricated by the lubricating oil 9 in the oil reservoir 21b formed by the gap between the seal plate 21 and the sleeve 11. Since the lubricating oil 9 is supplied in sufficient quantity from this oil reservoir 21b, the service life of the bearing can be extended. Some of the bubbles produced in the lubricating oil 9 during operation are released from the opening 21a between the outer peripheral face of the shaft 10 and the inner peripheral end face of the seal plate 21, and accumulate in the oil reservoir 21b.

With a disk driving apparatus motor that makes use of the hydrodynamic bearing device of the first embodiment, the dynamic pressure generation groove 16a (thrust bearing) is formed in the thrust flange 16 in the face opposite the sleeve 11, and the rotating body is supported rotatably in the axial direction (thrust direction) by this one thrust bearing. As discussed above, with the hydrodynamic bearing device of the first embodiment, the rotating body is supported in the axial direction (thrust direction) by one thrust bearing, the rotating body moves in the direction of lifting up from the thrust flange 16 during rotational operation. However, with the hydrodynamic bearing device in the first embodiment, since the rotor magnet 18 is constituted such that the rotating body is attracted toward the base by the magnetic force on the base 12 (a metal sheet), this rotating body rotates in the desired location with respect to the shaft 10. It is also possible for the constitution to be such that the rotating body rotates at the desired position with respect to the shaft 10 when the magnetic center of the core 19 (stator) and the rotor magnet 18 (rotor) constituting the motor is shifted to an offset position.

As discussed above, with the hydrodynamic bearing device of the first embodiment, since the rotating body is in the desired position with respect to the shaft 10 during rotation, there is no unnecessary contact between the sleeve 11 or the retaining plate 20 and the thrust flange 16.

Assembly Method

Next, the method for assembling the hydrodynamic bearing device of the first embodiment constituted as above will be described through reference to appended FIG. 4.

Figure 4A:
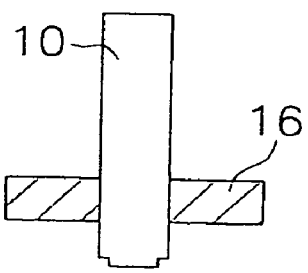
FIG. 4 consists of diagrams illustrating the method for assembling the hydrodynamic bearing device in the first embodiment pertaining to the present invention.
Figure 4B:
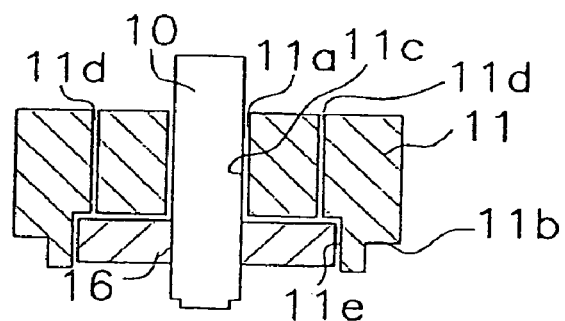
Figure 4C:
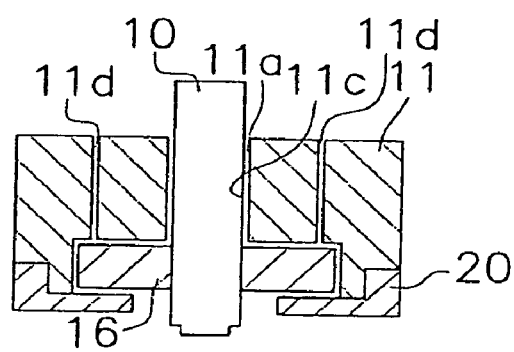
Figure 4D:
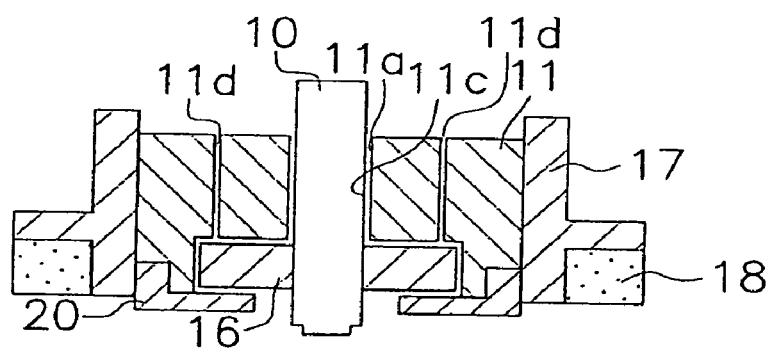
Figure 4E:
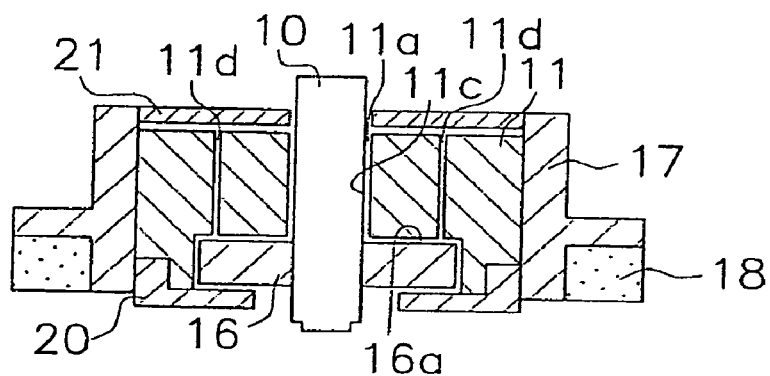

FIG. 4 consists of schematic diagrams illustrating the method for assembling the hydrodynamic bearing device of the first embodiment, and shows this assembly in the order of FIGS. 4a, 4b, 4c, 4d, and 4e. FIG. 4a shows the state in which the thrust flange 16 has been affixed to the shaft 10 by press-fitting (or insertion) and an adhesive. To keep airtight between the upper side of the flange 16 and the lower side thereof, or improve strength, the shaft 10 and the thrust flange 16 may sometimes be machined integrally. When the shaft 10 is inserted into the thrust flange 16, they may be fixed by laser welding. In this case, the weld site may be overcoated with an adhesive to prevent the scattering of sludge or the like. As shown in FIG. 4b, after the thrust flange 16 has been affixed, the shaft 10 is inserted into the bearing hole 11a of the sleeve 11. Next, the retaining plate 20 is affixed by press-fitting and an adhesive to the stepped portion 11b formed at the outer peripheral face lower end of the sleeve 11 (see FIG. 4c). The rotor magnet 18 is affixed to the rotor hub 17, and the assembled sleeve 11 (including the shaft 10, the thrust flange 16, and the retaining plate 20) is affixed by press-fitting and an adhesive as shown in FIG. 4c to the inner peripheral face of the rotor hub 17 (see FIG. 4d). Next, the seal plate 21 is affixed to the upper part of the inner peripheral face of the rotor hub 17, leaving a gap of a specific distance with respect to the upper end face of the sleeve 11. Press-fitting and an adhesive are used for this affixing. Here, the seal plate 21 may be affixed by coating a part of the upper end face of the sleeve 11 and the inner peripheral face of the rotor hub 17 with an adhesive. After this, the lubricating oil 9 is added dropwise in a low pressure environment (such as a vacuum environment), and the system is returned to normal pressure to fill the inside of the bearing with oil. As a lubricating fluid, not only the lubricating oil 9 but also greases with high fluidity or ionic liquid can be utilized.

With the hydrodynamic bearing device thus assembled, the base 12 (metal sheet) is fixed to the lower end of the shaft 10 with the screw 14. The disk 1 is mounted on the rotor hub 17, and the disk 1 is fixed to the rotor hub 17 by a clamping member. Finally, the cover 13 is fixed to the upper end of the shaft 10 by the screw 15, which completes the disk driving apparatus motor in which the hydrodynamic bearing device of the first embodiment is used.

Effect

As discussed above, with the hydrodynamic bearing device of the first embodiment, and the disk driving apparatus motor in which this hydrodynamic bearing device is used, the base 12 is formed by stamping from a thin metal sheet, and the reinforcing rib 12a is provided to the base 12 to increase stiffness, which affords reductions in the size, weight, and thickness of the hydrodynamic bearing device. Furthermore, the use of this hydrodynamic bearing device makes possible reductions in the size, weight, and thickness of the motor and disk driving apparatus as well.

In the first embodiment, the seal plate 21 is disposed at the upper part of the sleeve 11 to form an oil reservoir, and this oil reservoir also communicates with the opening 21a. Accordingly, lubricant can be supplied in sufficient quantity during rotational operation, and any bubbles generated during rotation can be discharged. Also, the communicating hole 11d that allows communication between the oil reservoir and the thrust bearing is formed in the sleeve 11, which makes it possible to adjust the pressure of the thrust bearing, and allows any bubbles produced in the thrust bearing to be eliminated. Therefore, with the constitution of the first embodiment, the lift characteristics of the bearing portion are stable, and this in turn results in a longer service life for the bearing portion.

With the method for manufacturing a hydrodynamic bearing device of the first embodiment, the dynamic pressure generation groove can be formed in the individual members prior to assembly, such as the shaft, sleeve, or thrust flange, so as hydrodynamic bearing device of high precision can be formed easily, reliably, and at a high yield.

With the hydrodynamic bearing device of the first embodiment, the reinforcing rib 12a is provided to the base 12 made of a metal sheet, and the retaining plate 20, which is affixed to the sleeve 11, is disposed in the internal space formed by this reinforcing rib 12a, so the internal space of the hydrodynamic bearing device can be utilized more efficiently, and the size and thickness of the device can be reduced.

With the hydrodynamic bearing device of the first embodiment, the base 12 is formed by stamping a metal sheet, and the reinforcing rib 12a is formed to increase the rigidity of the base, sod the weight and thickness of the device can be reduced, and the desired strength can be ensured at the same time. Furthermore, with the first embodiment, the device is well suited to mass production and the manufacturing cost can be reduced.

Disk driving apparatuses, and particularly hard disk drives, have come to be used in portable devices as well in recent years. Accordingly, these devices need to be safe against falling impact, and good sealing performance is required of the bearings. Also, the conventional fixed type, which is used while fixed to a case, is giving way to a card type, in which the user owns a plurality of hard disk drives and installs them as needed, and since this means the devices will be removed and installed by the user more frequently, they need to have good toughness against load in the thickness direction when removed or installed. Furthermore, it is assumed that these devices are battery powered, so a low current consumption is needed. In light of this situation, a disk driving apparatus equipped with the hydrodynamic bearing device of the first embodiment is provided with the seal plate 21 to improve sealing. Furthermore, the hydrodynamic bearing device of the first embodiment is a fixed-shaft bearing device, and has a structure in which the shaft is fixed to the base 12 and the cover 13. Therefore, good toughness against load in the thickness direction is ensured. Also, since the bearing device has a shaft that is fixed at both ends, sufficient rigidity can be obtained even with a smaller shaft diameter, as compared to a bearing device that is fixed at just one end. Therefore, the shaft diameter can be reduced, there is a reduction in loss attributable to the bearing, and current consumption can be decreased.

Modifications (1)

Figure 5:
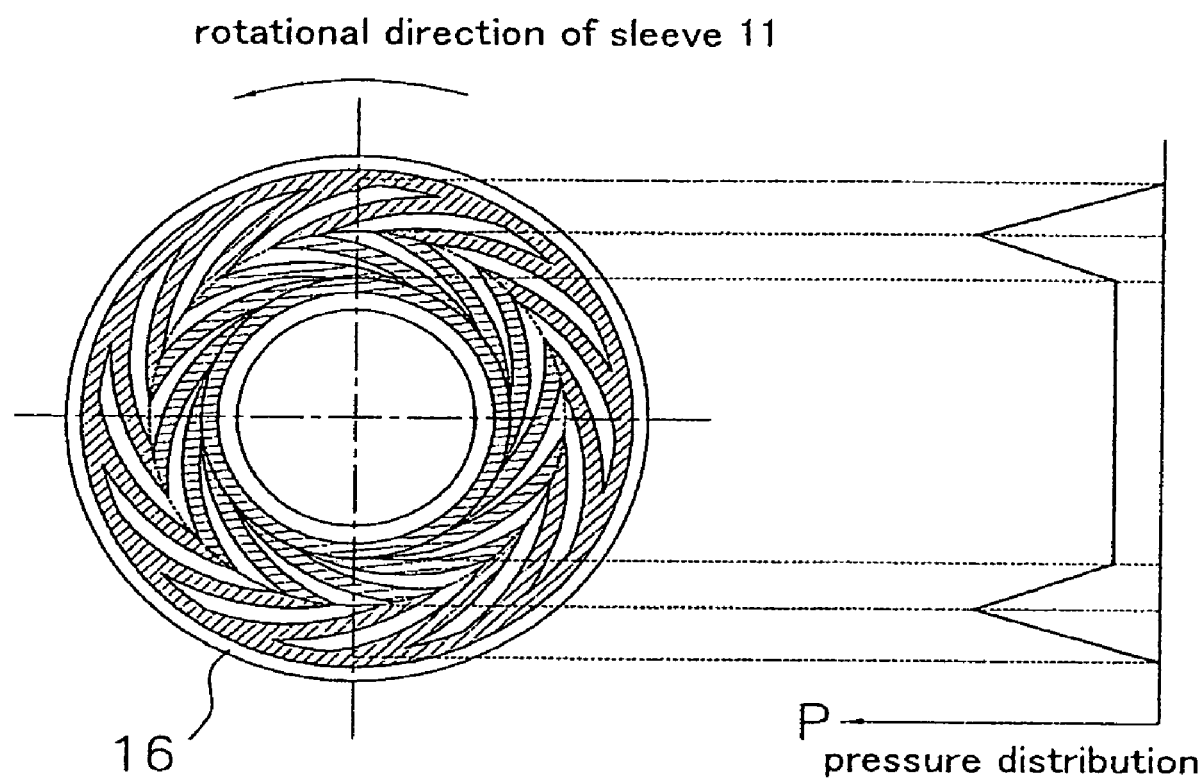
FIG. 5 is a diagram of the structure of a thrust bearing in a modification of the first embodiment pertaining to the present invention.

In the "Bearing Structure" section of the above embodiment, the description was of forming a spiral dynamic pressure groove in the thrust flange 16, but the asymmetric herringbone dynamic pressure groove shown in FIG. 5 may be formed in the thrust flange 16, rather than a spiral dynamic pressure groove.

The asymmetric herringbone dynamic pressure groove shown in FIG. 5 is made up of an outer peripheral groove, consisting of a plurality of grooves that extend in the rotational direction of the sleeve 11 (counterclockwise in FIG. 5) from the outer peripheral side of the thrust flange 16 to the center part, and whose radius of curvature decreases toward the center, and an inner peripheral groove, consisting of a plurality of grooves that extend in the rotational direction of the sleeve 11 (counterclockwise in FIG. 5) from the inner peripheral side of the thrust flange 16 to the center part, and whose radius of curvature increases toward the center. The center part is provided to the inner peripheral side from the location where the radial region in which the grooves are formed is equally divided in the radial direction, and the length of the outer peripheral grooves is greater than the length of the inner peripheral grooves. As a result, when there is relative rotation between the sleeve 11 and the thrust flange 16, the dynamic pressure generation groove 16a generates a circulation force that circulates the lubricating oil 9 from the outer peripheral side of the thrust flange 16 toward the inner peripheral side.

The radial bearing here has the structure described in the above embodiment.

With the above configuration, circulation force is generated by the thrust bearing and the radial bearing, and this force circulates the lubricating oil 9.

(2)

Figure 6:
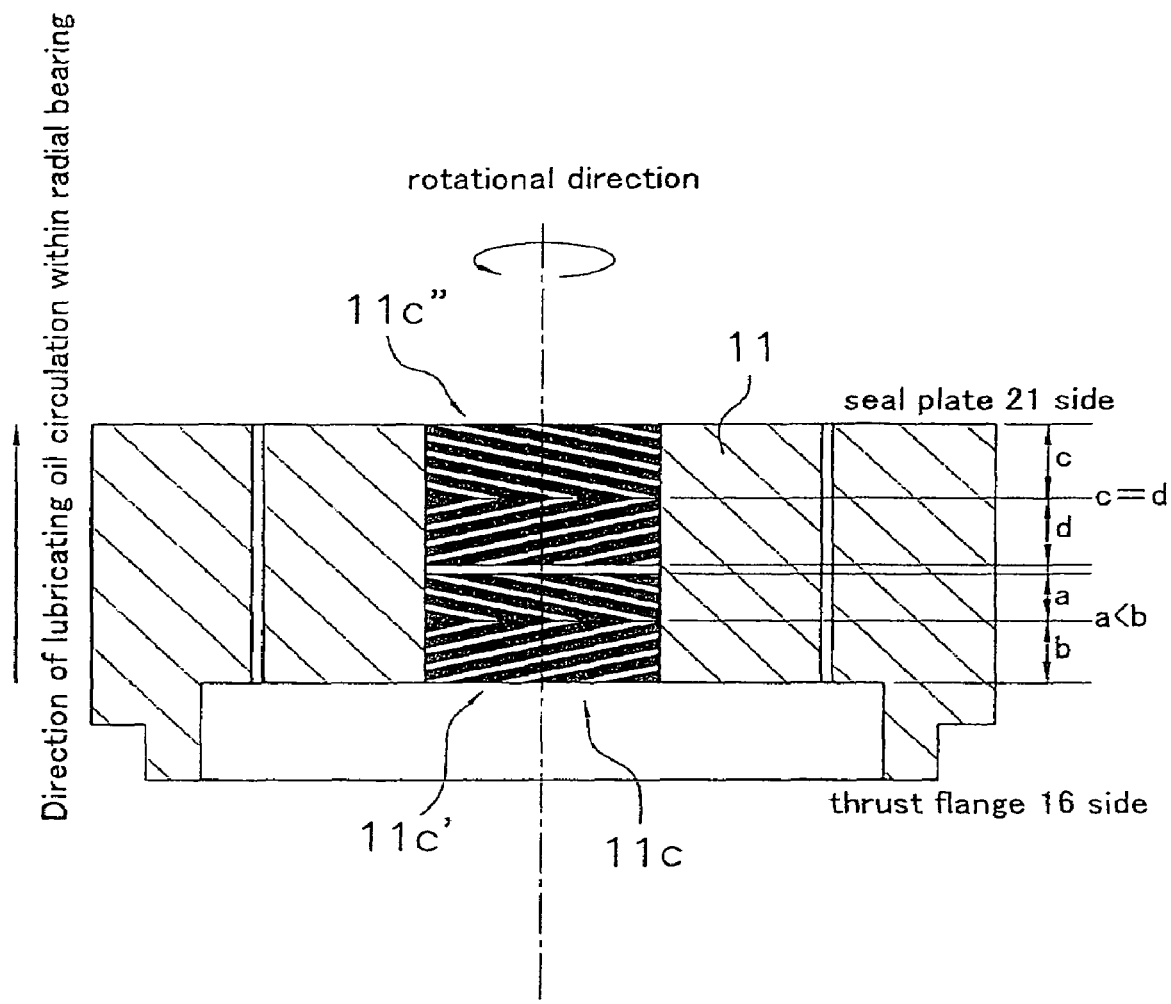
FIG. 6 is a diagram of the structure of a radial bearing in a modification of the first embodiment pertaining to the present invention.

In the "Bearing Structure" section of the above embodiment, the description was of forming an asymmetric herringbone dynamic pressure groove in the inner peripheral face of the sleeve 11, but the dynamic pressure generation groove 11c with the upper and lower bearing structure shown in FIG. 6 may be formed in the sleeve 11, rather than a single groove.

Here, either of the dynamic pressure generation grooves 11c is an asymmetric herringbone dynamic pressure groove or an asymmetric spiral dynamic pressure groove, formed such that the lubricating oil 9 will circulate through the radial bearing from the thrust flange 16 side toward the oil reservoir 21b side.

In FIG. 6, of the upper and lower bearing structures, the radial bearing 11c' on the lower side (the thrust flange 16 side) is formed as an asymmetric herringbone dynamic pressure groove, while the radial bearing 11c" on the upper side (the seal plate 21 side) is formed as a symmetric herringbone dynamic pressure groove.

The lower radial bearing 11c' is made up of lower grooves that angle down in the rotational direction of the sleeve 11 (to the left in FIG. 6), and generate pressure for moving the lubricating oil 9 upward in the axial direction when there is relative rotation between the sleeve 11 and the shaft 10, and upper grooves that angle upward in the rotation direction of the sleeve 11, and generate pressure for moving the lubricating oil 9 downward in the axial direction when there is relative rotation between the sleeve 11 and the shaft 10. The length of the lower grooves is set longer than the length of the upper grooves. As a result, when there is relative rotation between the sleeve 11 and the shaft 10, the lower radial bearing 11c' generates a circulation force for circulating the lubricating oil 9 from the thrust flange 16 side toward the seal plate 21 side.

The upper radial bearing 11c" is made up of lower grooves that angle down in the rotational direction of the sleeve 11 (to the left in FIG. 6), and generate pressure for moving the lubricating oil 9 upward in the axial direction when there is relative rotation between the sleeve 11 and the shaft 10, and upper grooves that angle upward in the rotation direction of the sleeve 11, and generate pressure for moving the lubricating oil 9 downward in the axial direction when there is relative rotation between the sleeve 11 and the shaft 10. The length of the lower grooves is set longer than the length of the upper grooves.

With the above configuration, when there is relative rotation between the sleeve 11 and the shaft 10, the dynamic pressure generation groove 11c circulates the lubricating oil 9 through the radial bearings from the thrust flange 16 side toward the oil reservoir 21b side (the seal plate 21 side).

The thrust bearing here has the configuration described in the above embodiments or modifications.

With the above configuration, a circulation force is generated by the thrust bearing and radial bearing to circulate the lubricating oil 9.

(3)

In the "Bearing Structure" section of the above embodiment, the description was of generating the circulation force for the lubricating oil 9 by both the radial bearing and the thrust bearing, but the circulation force for the lubricating oil 9 here may instead be generated by just the thrust bearing.

The thrust bearing here may be the spiral dynamic pressure groove shown in FIG. 3, or may be the asymmetric herringbone dynamic pressure groove shown in FIG. 5.

Figure 7:
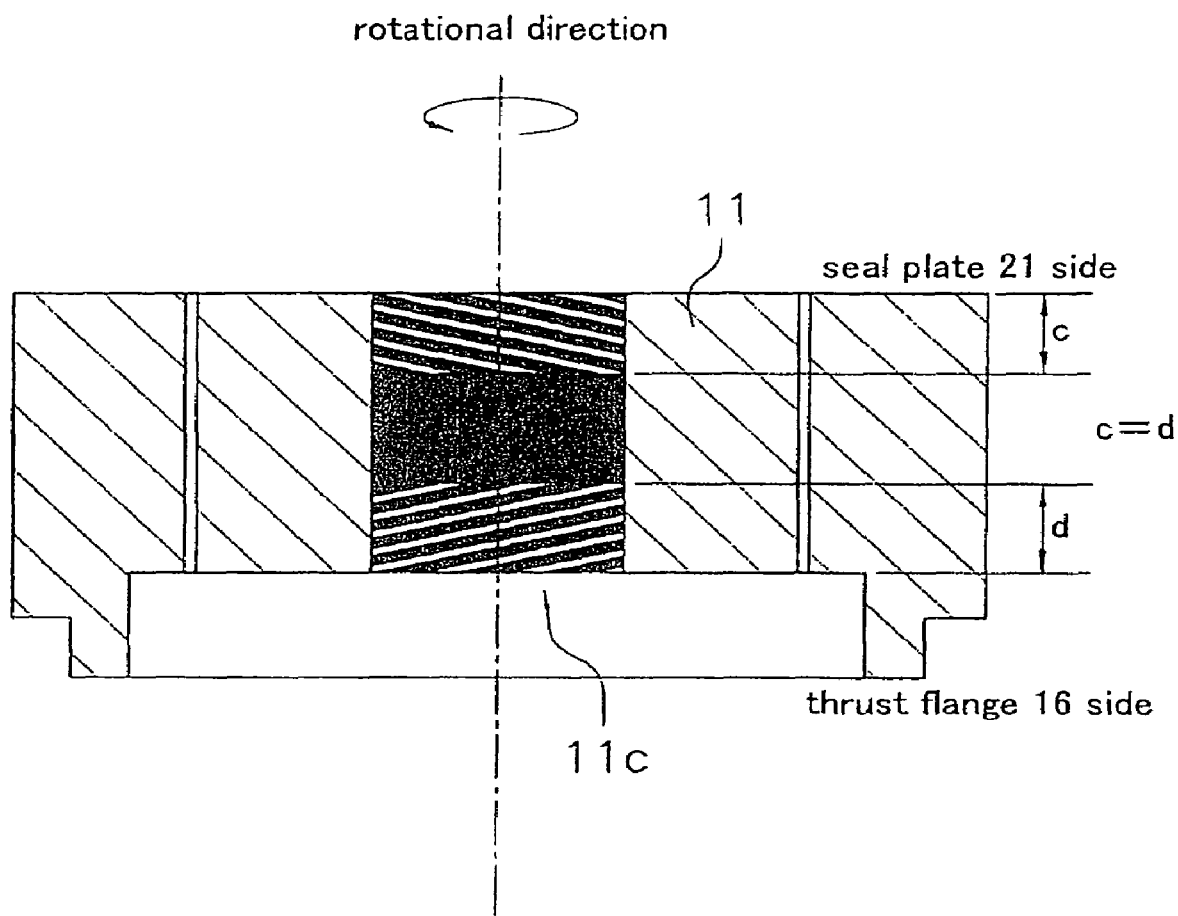
FIG. 7 is a diagram of the structure of a radial bearing in a modification of the first embodiment pertaining to the present invention.

Also, the radial bearing here may have either a single configuration or an upper and lower bearing configuration. Also, when the thrust bearing is the spiral dynamic pressure groove or the asymmetric herringbone dynamic pressure groove, the dynamic pressure generation groove 11c of the radial bearing may be symmetric herringbone in shape, or may be the symmetric spiral dynamic pressure groove shown in FIG. 7. The symmetric spiral dynamic pressure groove shown in FIG. 7 is made up of lower grooves and upper grooves. The lower grooves angle downward in the rotation direction of the sleeve 11 (to the left in FIG. 2), and generate pressure for moving the lubricating oil 9 upward in the axial direction when there is relative rotation between the sleeve 11 and the shaft 10. The upper grooves angle upward in the rotation direction of the sleeve 11, and generate pressure for moving the lubricating oil 9 downward in the axial direction when there is relative rotation between the sleeve 11 and the shaft 10. The length of the lower grooves is set equal to the length of the upper grooves, and the grooves are formed so as to raise the pressure in the center part of the lower grooves and the upper grooves.

(4)

In the "Bearing Structure" section of the above embodiment, the description was of generating the circulation force for the lubricating oil 9 by both the radial bearing and the thrust bearing, but the circulation force for the lubricating oil 9 here may instead be generated by just the radial bearing.

Figure 2:
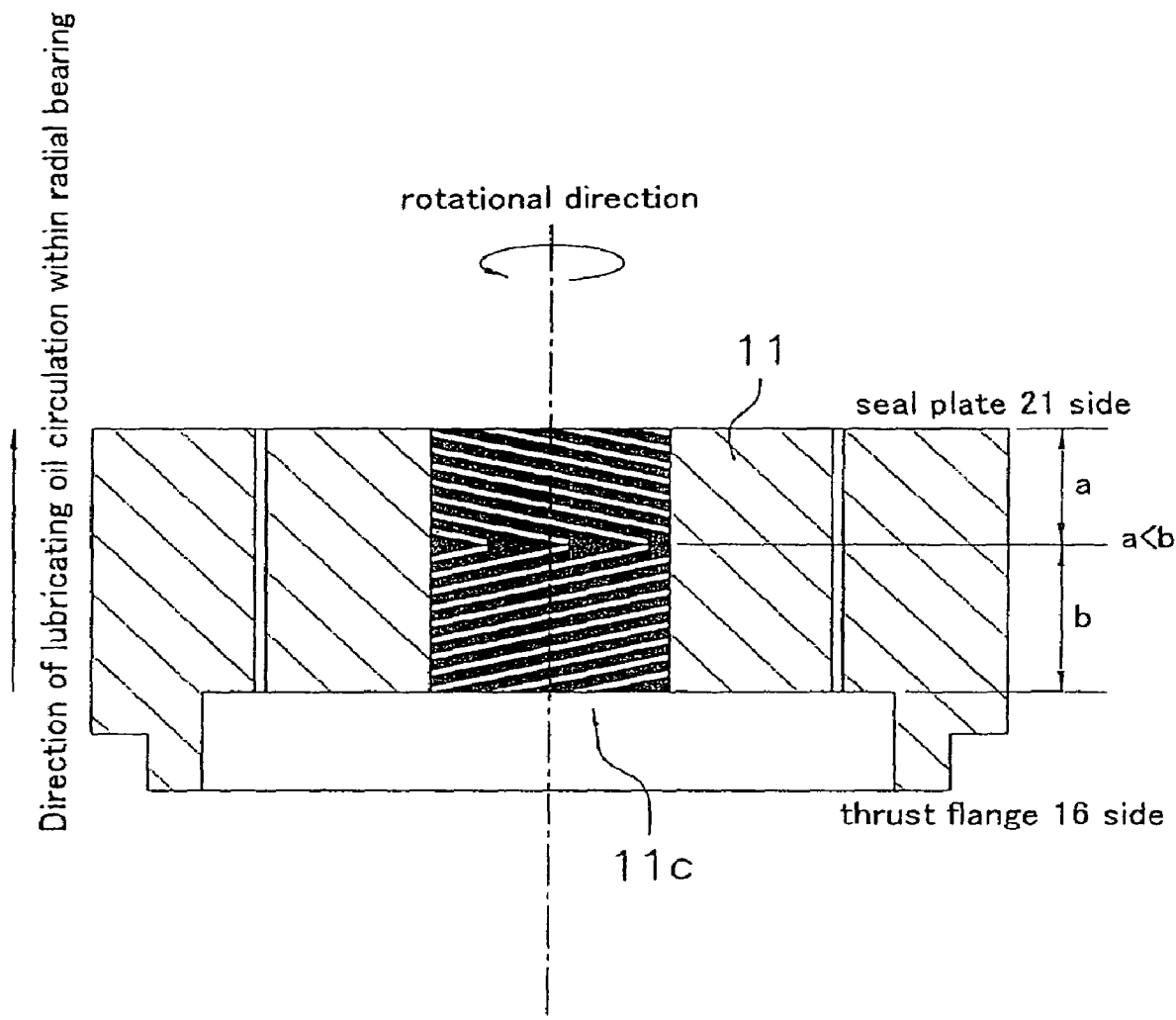
FIG. 2 is a diagram of the structure of a radial bearing in the first embodiment pertaining to the present invention.
Figure 8:
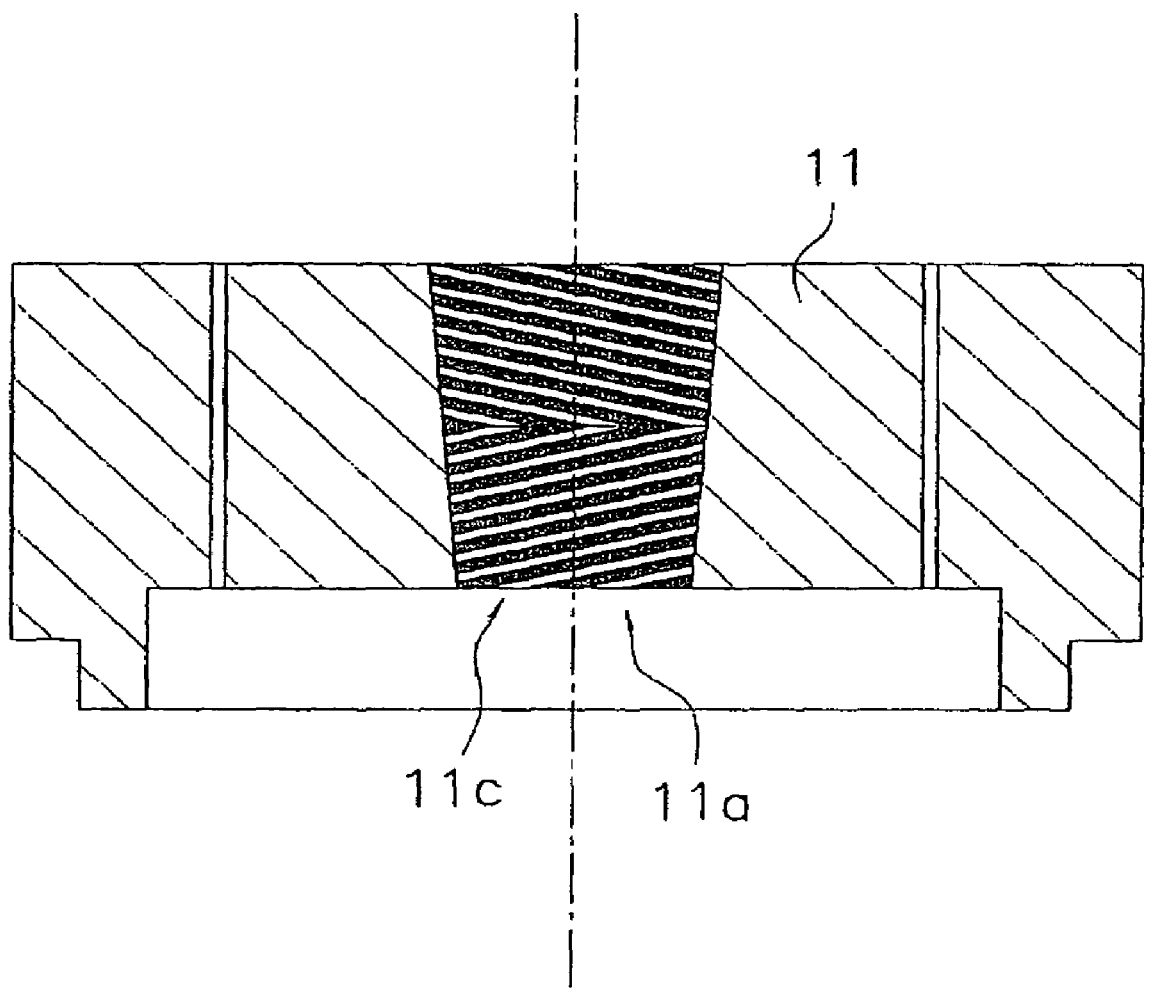
FIG. 8 is a diagram of the structure of a radial bearing in a modification of the first embodiment pertaining to the present invention.

The radial bearing here has the configuration described in the above embodiments or modifications, as described through reference to FIGS. 2 and 6. The length of the lower grooves of the symmetric spiral dynamic pressure groove described through reference to FIG. 7 may be set longer than the length of the upper grooves, and an asymmetric spiral dynamic pressure groove may be formed that moves the lubricating oil 9 upward in the axial direction. Furthermore, as shown in FIG. 8, the bearing hole 11a of the sleeve 11 may include a inclined face that is inclined such that the gap in the radial direction between the sleeve 11 and the shaft 10 increases upward in the axial direction. With a sleeve 11 such as this, the pressure generated on the lower side in the axial direction where the radial gap is narrower is greater than the pressure generated on the upper side in the axial direction where the radial gap is wider, and the lubricating oil 9 is circulated upward in the axial direction. The inclined face shown in FIG. 8 has an inclination that is more exaggerated than in an actual case in order to facilitate its description. This inclined face is formed, for example, by machining (with a lathe or the like) the cylindrical bearing hole 11a in the sleeve 11, which is made of brass or the like. The dynamic pressure generation groove formed in the inclined face by rolling or the like may be an asymmetric herringbone dynamic pressure groove or a symmetric herringbone dynamic pressure groove, and the inclined face may work in conjunction with the dynamic pressure generation groove to circulate the lubricating oil 9 upward in the axial direction.

Figure 9:
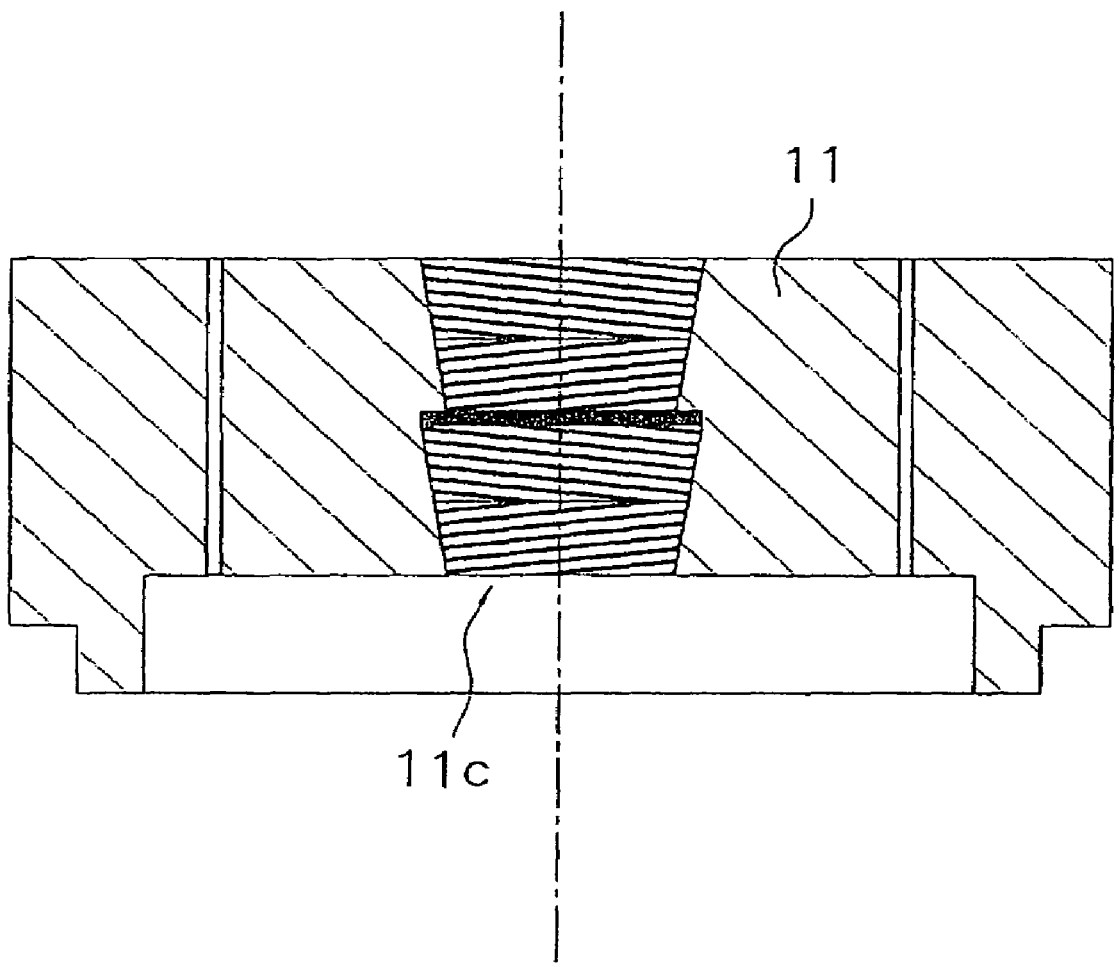
FIG. 9 is a diagram of the structure of a radial bearing in a modification of the first embodiment pertaining to the present invention.

These radial bearings may have a single configuration or an upper and lower bearing configuration. For example, as shown in FIG. 9, the configuration may be such that there are upper and lower inclined faces in the axial direction.

The thrust bearing here may be formed as a symmetric herringbone dynamic pressure groove in which the length of the outer peripheral groove of the asymmetric herringbone dynamic pressure grooves describe through reference to FIG. 5 is set equal to the length of the inner peripheral groove.

Second Embodiment

Figure 10:
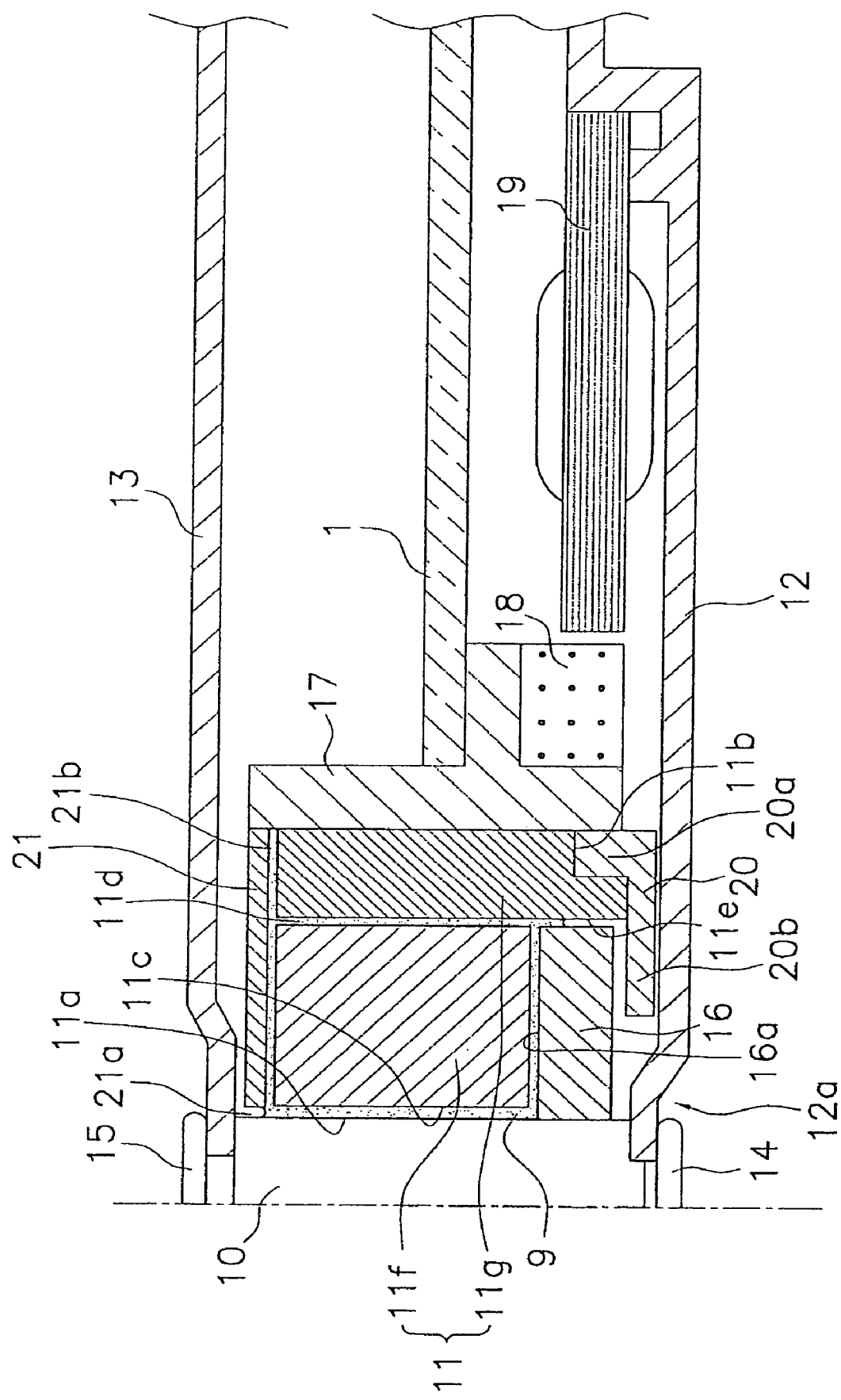
FIG. 10 is a cross section of the right half of the structure of a disk driving apparatus motor that makes use of the hydrodynamic bearing device in a second embodiment.
Figure 11:
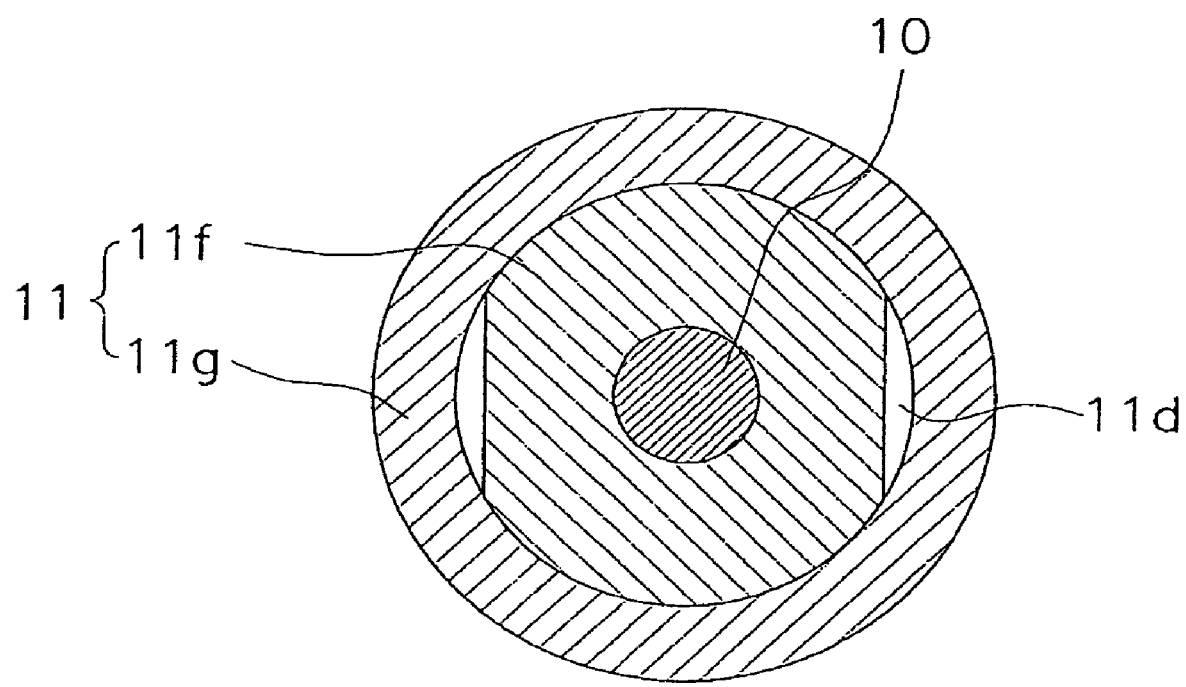
FIG. 11 is a plan view of the shaft and sleeve, which are bearing components in the disk driving apparatus motor of the second embodiment.

A disk driving apparatus motor that makes use of the hydrodynamic bearing device of a second embodiment pertaining to the present invention will be described through reference to FIGS. 10 and 11. FIG. 10 is a cross section of the right half of the structure of a disk driving apparatus motor that makes use of the hydrodynamic bearing device of the second embodiment. FIG. 11 is a plan view of the shaft and sleeve, which are being components in the disk driving apparatus motor of the second embodiment. In FIGS. 10 and 11, those functions and configurations that are the same as in the first embodiment discussed above are numbered the same, and will not be described again.

With the disk driving apparatus motor that makes use of the hydrodynamic bearing device of the second embodiment, the only difference from the disk driving apparatus motor of the first embodiment is in the configuration of the sleeve, and the rest of the configuration is the same.

Overall Structure

In FIGS. 10 and 11, the sleeve 11 is made up of two members in the disk driving apparatus motor of the second embodiment. An inner sleeve 11f, which is the first member, has a bearing hole 11a that goes through the shaft 10, and an outer sleeve 11g is affixed to the outer peripheral face of the inner sleeve 11f. The outer sleeve 11g is in the form of a hollow cylinder, and a communicating hole 11d is formed by a cutout portion formed in the outer peripheral face of the inner sleeve 11f.

The inner sleeve 11f is formed such that the length along its rotational center axis is shorter than that of the outer sleeve 11g, and the upper end face of the inner sleeve 11f and the upper end face of the outer sleeve 11g are disposed in substantially the same plane. The thrust flange 16 is disposed across from the lower end face of the inner sleeve 11f, and is provided in the lower space formed by the inner sleeve 11f and the outer sleeve 11g. The stepped portion 11b is formed at the lower end face of the outer sleeve 11g, and the retaining plate 20 (retaining means) is affixed to this face. The seal plate 21 is affixed to part of the upper end face of the outer sleeve 11g.

The disk driving apparatus motor of the second embodiment configured as discussed above exhibits the same effects as the disk driving apparatus motor of the first embodiment discussed above, and also allows the sleeve 11 to consist of two members with a simple shape, and therefore the sleeve can be machined to high precision more easily, and a motor of high reliability can be assembled more easily.

Bearing Structure

In the overall structure above, the radial bearing and thrust bearing are configured as described in the section titled "Bearing Structure" in the first embodiment. Specifically, the dynamic pressure generation groove 11c discussed in the section titled "Bearing Structure" in the first embodiment is formed in the bearing hole 11a of the inner sleeve 11f, and the dynamic pressure generation groove 16a is formed in the thrust flange 16. The structure of the bearings is not limited to this, however, and may be as discussed in "Modifications" (1) to (4) in the first embodiment. Specifically, the radial bearing and the thrust bearing may be configured such that the lubricating oil 9 moves through the radial bearing from the thrust flange 16 side to the seal plate 21 side, moves through the seal plate 21 from the inner peripheral side to the outer peripheral side, moves through the communicating hole 11d from the seal plate 21 side to the thrust flange 16 side, and moves through the thrust bearing from the outer peripheral side to the inner peripheral side.

As a result, the direction in which centrifugal force acts on the oil reservoir matches the circulation direction of the lubricating fluid 9 in the oil reservoir 21b, oil starvation in the bearing can be prevented, and centrifugal force can be utilized to increase the circulation force.

Modifications

Figure 12:
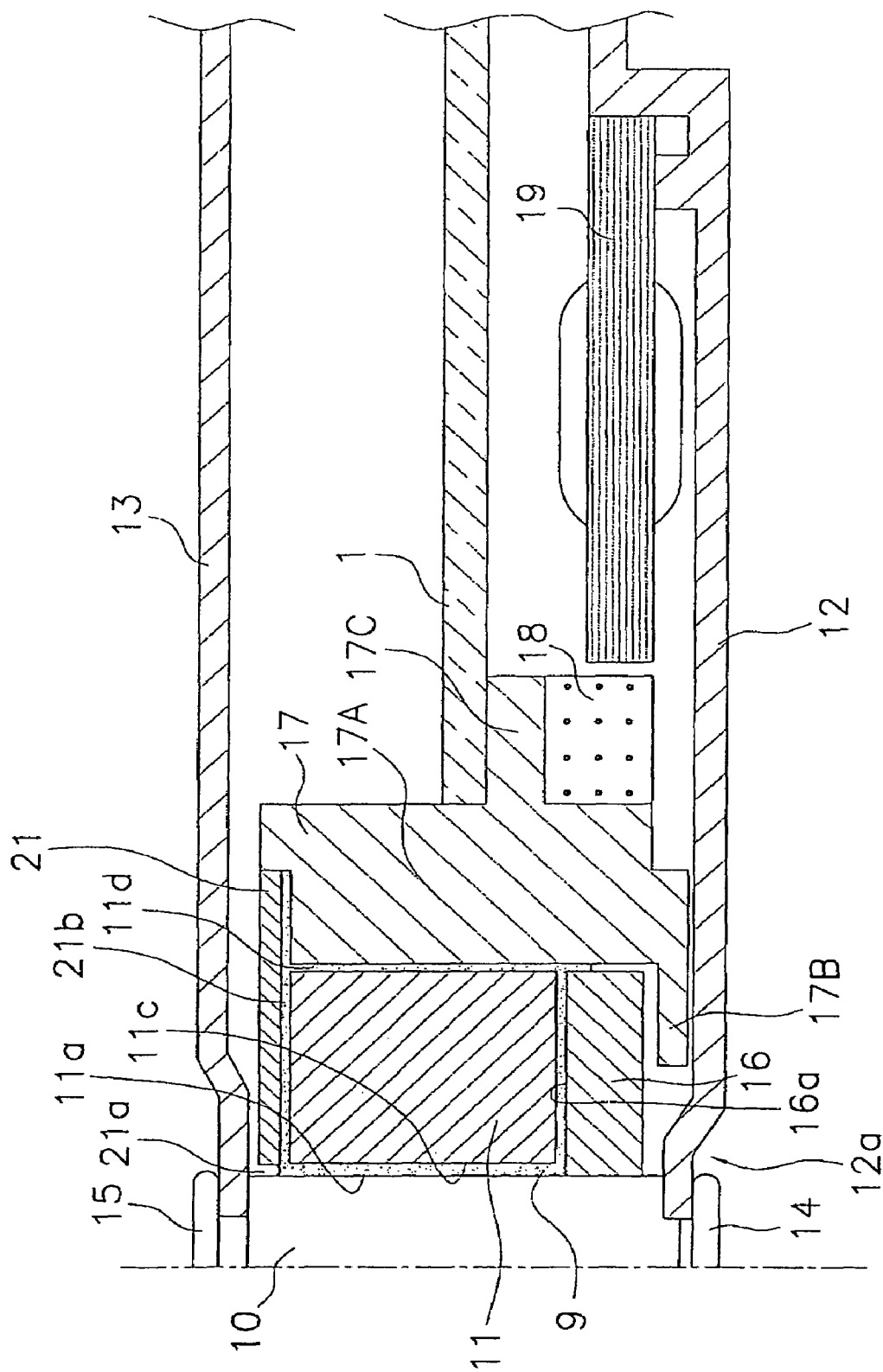
FIG. 12 is a cross section of a right half of the structure of a disk driving apparatus motor that makes use of the hydrodynamic bearing device in a modification of the second embodiment.

A disk driving apparatus motor that makes use of a hydrodynamic bearing device will be described through reference to FIGS. 12 and 13 as modifications of the second embodiment. FIG. 12 is a cross section of the right half of the structure of a disk driving apparatus motor that makes use of the hydrodynamic bearing device in a modification of the second embodiment. FIG. 13 consists of diagrams illustrating how the hydrodynamic bearing device is assembled in a modification of the second embodiment. In FIGS. 12 and 13, those functions and configurations that are the same as in the first and second embodiments discussed above are numbered the same, and will not be described again.

With the disk driving apparatus motor that makes use of the hydrodynamic bearing device in a modification of the second embodiment, the outer sleeve 11g, the retaining plate 20, and the rotor hub 17 in the disk driving apparatus motor of the second embodiment are formed integrally, and the rotor hub 17 is formed, but the rest of the configuration is substantially the same.

Overall Structure

As shown in FIG. 12, the sleeve 11 in the disk driving apparatus motor in a modification has the same structure as that of the inner sleeve 11f shown in FIG. 10. More specifically, the sleeve 11 is a substantially cylindrical member having a bearing hole 11a that passes through the shaft 10, and the inner peripheral face of the rotor hub 17 is affixed to the outer peripheral face thereof. A cutout portion is formed in at least one location around the outer peripheral face of the sleeve 11, and the communicating hole 11d is formed by this cutout portion and the inner peripheral face of the rotor hub 17.

The rotor hub 17 is formed as shown in FIG. 10, such that the outer sleeve 11g, the retaining plate 20, and the rotor hub 17 are formed integrally. Specifically, the rotor hub 17 is made up primarily of a side component 17A having an inner peripheral face that is across from the outer peripheral faces of the sleeve 11 and the thrust flange 16, a retainer 17B that is provided on the lower end side of the side component 17A and has an axial direction face extending inward in the radial direction from the lower end side of the inner peripheral face of the side component 17A, and an annular flange 17C that protrudes outward in the radial direction at the outer peripheral face of the side component 17A.

The inner peripheral face of the side component 17A has an axial direction length that is slightly longer than the axial direction length of the sleeve 11 and the thrust flange 16. The sleeve 11 is fixed by being fitted to the inner peripheral face of the side component 17A. The upper end face of the sleeve 11 and the upper end face of the side component 17A are disposed in substantially the same plane. As a result, an annular space having an axial direction length that is slightly longer than the axial direction length of the thrust flange 16 is formed between the lower end face of the sleeve 11 and the axial direction face of the retainer 17B. The thrust flange 16 is disposed so that its outer peripheral side is located in this annular space. Specifically, the thrust flange 16 is disposed with its upper end face across from the lower end face of the sleeve 11, and with its lower end face across from the axial direction face of the retainer 17B. With this structure, the sleeve 11 and the rotor hub 17 are capable of relative rotation with respect to the thrust flange 16, and relative movement in the axial direction with respect to the thrust flange 16 is restricted.

The disk 1 is mounted on the upper side of the flange 17C. The rotor magnet 18 is affixed to the lower side of the flange 17C.

An annular protrusion that protrudes in the axial direction is formed on part of the outer peripheral side of the upper end face of the rotor hub 17. The seal plate 21 is affixed by being fitted to the inner peripheral face of this protrusion.

Bearing Structure

In the overall structure above, the radial bearing and thrust bearing are configured as described in the section titled "Bearing Structure" in the first embodiment. Specifically, the dynamic pressure generation groove 11c discussed in the section titled "Bearing Structure" in the first embodiment is formed in the bearing hole 11a of the inner sleeve 11f, and the dynamic pressure generation groove 16a is formed in the thrust flange 16. The structure of the bearings is not limited to this, however, and may be as discussed in "Modifications" (1) to (4) in the first embodiment. Specifically, the radial bearing and the thrust bearing may be configured such that the lubricating oil 9 moves through the radial bearing from the thrust flange 16 side to the seal plate 21 side, moves through the seal plate 21 from the inner peripheral side to the outer peripheral side, moves through the communicating hole 11d from the seal plate 21 side to the thrust flange 16 side, and moves through the thrust bearing from the outer peripheral side to the inner peripheral side.

As a result, the direction in which centrifugal force acts on the oil reservoir matches the circulation direction of the lubricating fluid 9 in the oil reservoir 21b, oil starvation in the bearing can be prevented, and centrifugal force can be utilized to increase the circulation force.

Assembly Method

Next, the method for assembling the hydrodynamic bearing device in modifications constituted as above will be described through reference to the appended FIG. 13.

Figure 13A:
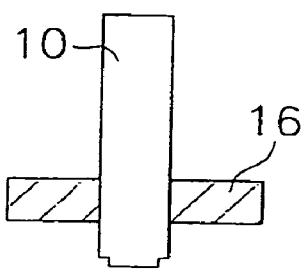
FIG. 13 consists of diagrams illustrating how the hydrodynamic bearing device is assembled in a modification of the second embodiment.
Figure 13B:
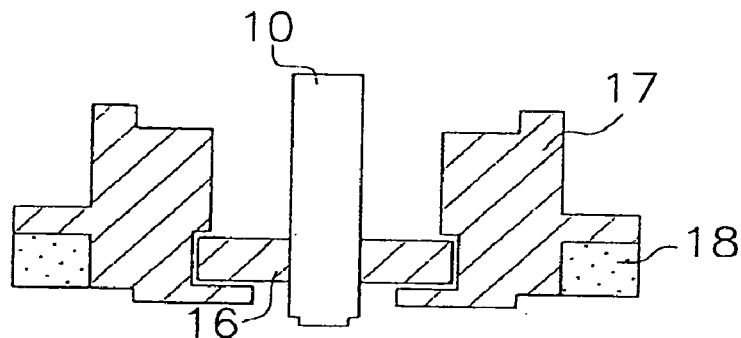
Figure 13C:
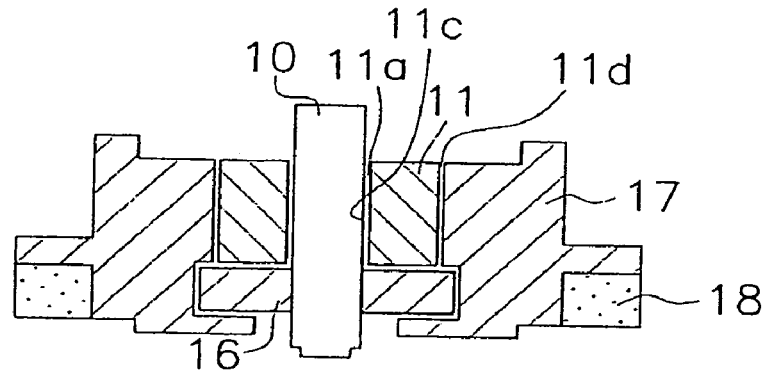

FIG. 13 is a schematic illustrating the method for assembly the hydrodynamic bearing device in a modification, and shows this assembly in the order of FIGS. 13a, 13b, 13c, and 13d. FIG. 13a shows the state in which the thrust flange 16 has been affixed to the shaft 10 by press-fitting (or insertion) and an adhesive. The shaft 10 and the thrust flange 16 may sometimes be machined integrally. When the shaft 10 is inserted into the thrust flange 16, they may be fixed by laser welding. In this case, the weld site may be overcoated with an adhesive to prevent the scattering of sludge or the like. As shown in FIG. 13b, after the thrust flange 16 has been affixed, the shaft 10 is disposed on the inside of the rotor hub 17 described through reference to FIG. 12. Here, the lower end of the shaft 10 is inserted in a hole formed on the inner peripheral side of the retainer 17B of the rotor hub 17, and the lower end face of the thrust flange 16 is disposed across from the axial direction face of the retainer 17B. Before or after this step, the rotor magnet 18 is affixed to the rotor hub 17. The sleeve 11 is inserted from the upper end side of the shaft 10, and the sleeve 11 is fixed by press-fitting and an adhesive to the inner peripheral face of the rotor hub 17 (see FIG. 13c). Here, the sleeve 11 is press-fitted until the axial location of its upper end face matches the axial location of the upper end face of the rotor hub 17.

The assembly of the sleeve 11 and the rotor hub 17 may be carried out by the following procedure. A specific location of the outer periphery of the sleeve 11 is coated with an adhesive, and the sleeve 11 is set in a jig. A cutout is provided ahead of time to the outer periphery of the sleeve 11, and the sleeve 11 is fixed by press-fitting and an adhesive to the inner peripheral face of the rotor hub 17, which forms the communicating hole 11d. First the shaft assembly (the shaft 10 to which the thrust flange 16 has been affixed) is inserted into the sleeve 11 held in the jig. Then, the rotor hub 17 is press-fitted on so as to cover the sleeve 11 and the shaft assembly. Here, the rotor hub 17 is press-fitted until the axial location of its upper end face matches the axial location of the upper end face of the sleeve 11.

Figure 13D:
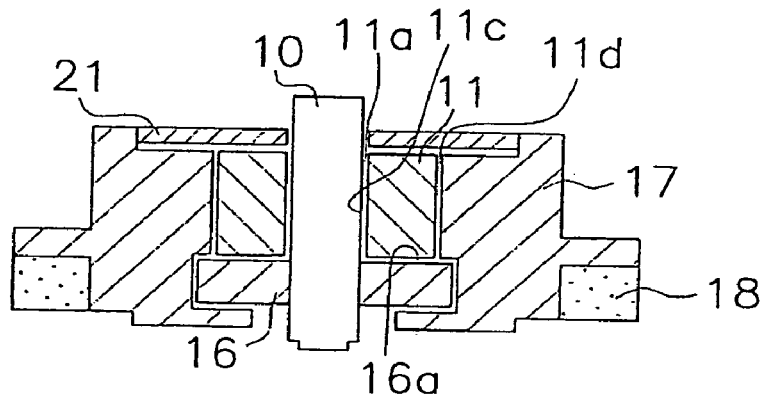

Next, the seal plate 21 is affixed to the rotor hub 17, ensuring a gap of a specific distance from the upper end face of the sleeve 11 (see FIG. 13d). More specifically, the seal plate 21 is affixed by being fitted to the inner peripheral face of the annular protrusion formed on the upper end face of the rotor hub 17. This affixing is accomplished by press-fitting and an adhesive. After this, the lubricating oil 9 is added dropwise in a low pressure environment (such as a vacuum environment), and the system is returned to normal pressure to fill the inside of the bearing with oil.

With the hydrodynamic bearing device thus assembled, the base 12 (metal sheet) is fixed to the lower end of the shaft 10 with the screw 14. The disk 1 is mounted on the rotor hub 17, and the disk 1 is fixed to the rotor hub 17 by a clamping member. Finally, the cover 13 is fixed to the upper end of the shaft 10 by the screw 15, which completes the disk driving apparatus motor that makes use of a hydrodynamic bearing device in a modification.

Effect

The disk driving apparatus motor in a modification configured as discussed above exhibits the same effects as the disk driving apparatus motor of the first or second embodiment discussed above, and also can be made up of fewer parts, which reduces the manufacturing cost and the manufacturing steps.

Modifications

The structure of the communicating hole 11d is not limited to that discussed above.

Figure 14A:
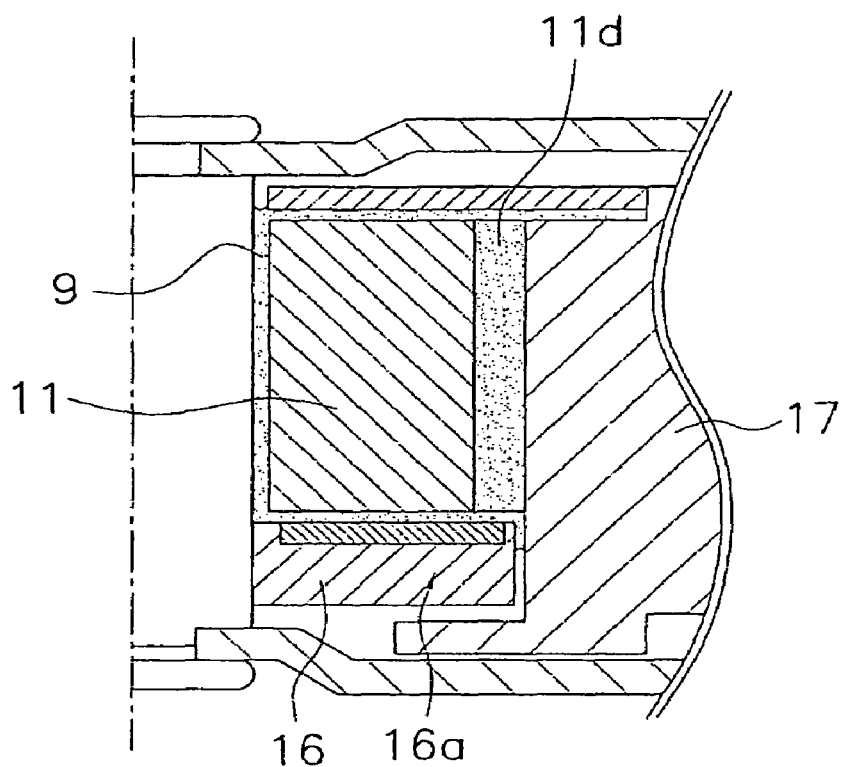
FIG. 14a is a cross section of the structure of the hydrodynamic bearing device in a modification of the second embodiment.

For instance, with the disk driving apparatus motor shown in FIG. 12, as shown in FIG. 14a, the communicating hole 11d may be disposed or formed such that the opening thereof on the thrust flange 16 side opens at a location that overlaps at least part of the region where the dynamic pressure generation groove 16a is formed on the thrust flange 16 in which the thrust bearing is formed.

Figure 14B:
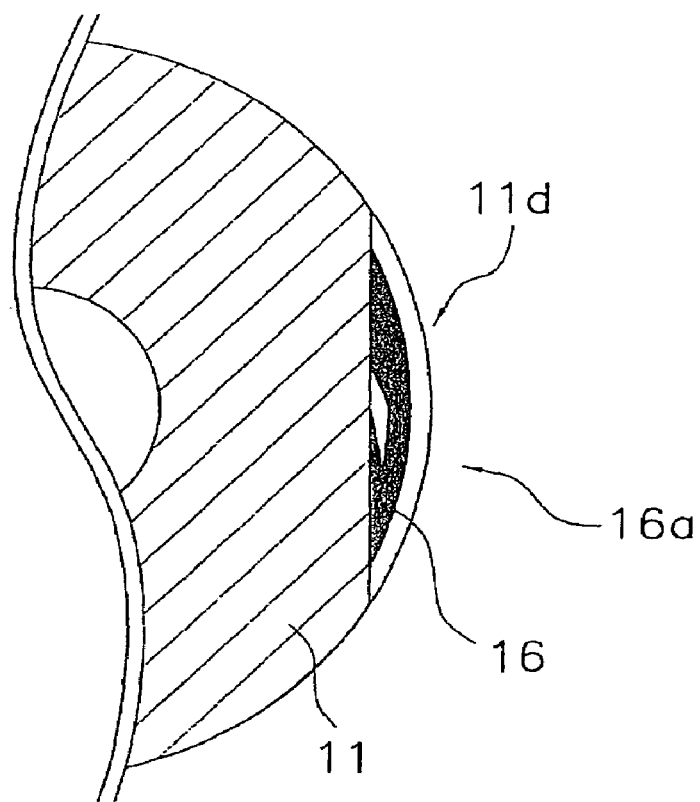
FIG. 14b is a plan view of the sleeve and thrust flange.

FIG. 14b is a cross section illustrating the positional relationship when the sleeve 11 and the thrust flange 16 are viewed from the seal plate 21 side in the axial direction. As shown in FIG. 14b, the cutout forming the communicating hole 11d is formed so as to overlap the region where the dynamic pressure generation groove 16a is formed. Without the overlap, air bubbles tend to accumulate around the boundary between the communicating hole 11d and the thrust bearing.

With the above structure, the lubricating oil 9 inside the communicating hole 11d is subjected to sufficient suction force by the circulation force generated by the dynamic pressure generation groove of the thrust bearing, and this increases the circulation force exerted on the lubricating oil 9 inside the communicating hole 11d as well.

The structure of the communicating hole 11d described here can be similarly applied to the disk driving apparatus motor shown in FIG. 10.

Furthermore, the structure of the communicating hole 11d described here can be broadly applied to hydrodynamic bearing devices having a communicating hole that opens to a gap in which a thrust bearing is formed.

Other

With the hydrodynamic bearing devices in the first and second embodiments, the oil reservoir was created by forming a specific space between the sleeve 11 and the seal plate 21 disposed at the upper end face thereof, but the space volume used for the oil reservoir can also be made larger. For instance, the space volume of the oil reservoir can be increased by forming a recess in the face across from the sleeve 11 or the seal plate 21, or in both of these faces.

Also, with the hydrodynamic bearing devices in the first and second embodiments, the description was of affixing the rotor hub 17 directly to the outer peripheral face of the sleeve 11, but it is possible to provide an intermediate member between the sleeve and the hub, so that the shaft 10, the sleeve 11, the thrust flange 16, the retaining plate 20, the seal plate 21, and the lubricating oil 9 are integrally constituted as a bearing member by this intermediate member. Thus providing an intermediate member to make the bearing members into a single unit simplifies assembly into a motor or a disk driving apparatus, and affords better work efficiency.

Furthermore, in the first and second embodiments the description was of a case in which the present invention was applied to a fixed shaft type of hydrodynamic bearing device, but the present invention can also be applied to a rotating shaft type of hydrodynamic bearing device.

Figure 15:
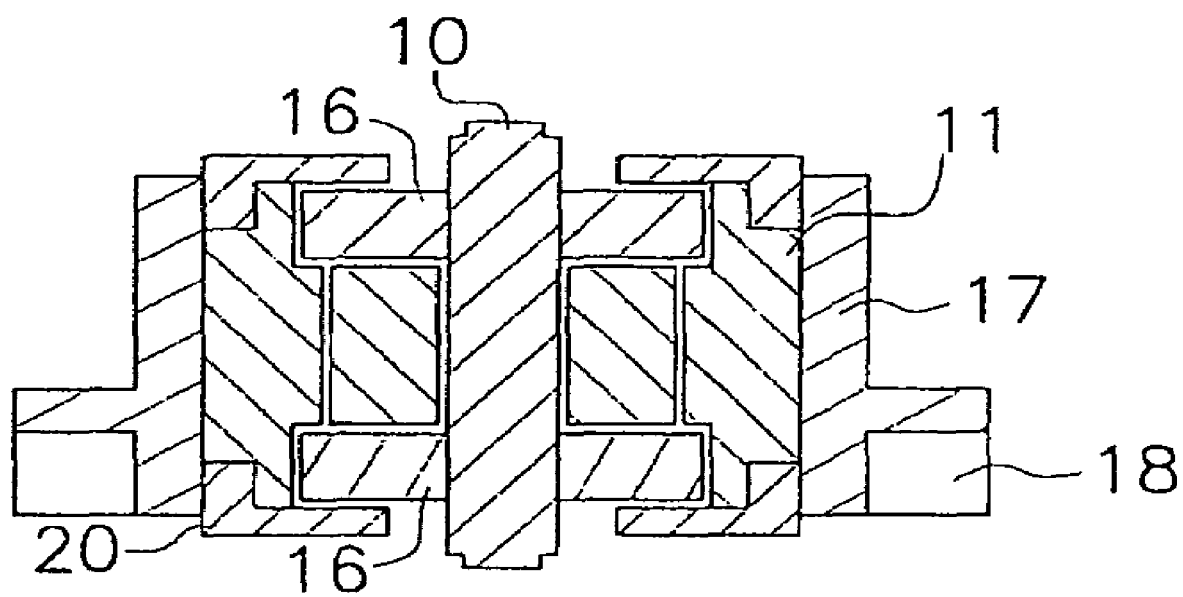
FIG. 15 is a cross section of the hydrodynamic bearing device in a modification of the present invention.

Also, in the first and second embodiments, the description was of a structure in which the thrust flange 16 was provided at the lower side of the shaft 10, but when it is acceptable to increase the size of the hydrodynamic bearing device by a certain amount in the axial direction, the present invention can also be applied to a structure in which the thrust flange 16 is provided to the upper side of the shaft 10 as shown in FIG. 15.

Thus, the present invention provides excellent effects as described in specific terms in the above embodiments. Therefore, with the present invention, reductions in size, weight, and thickness can be achieved, and a hydrodynamic bearing device that has high reliability, is well suited to mass production, and affords high working efficiency can be provided, as can a motor and a disk driving apparatus that make use of this.

The present invention was described above in some detail by giving preferred embodiments, but what was disclosed in these preferred embodiments will vary in the details of the configuration, and changes in the order or combination of the various constituent elements can be implemented without exceeding the scope or concept of the claimed invention.

Also, a hydrodynamic bearing device was described above as being used in a disk driving apparatus, but its applications are not limited to this. For instance, it may be used in a reel driving apparatus, capstan driving apparatus, or drum driving apparatus.

Figure 16:
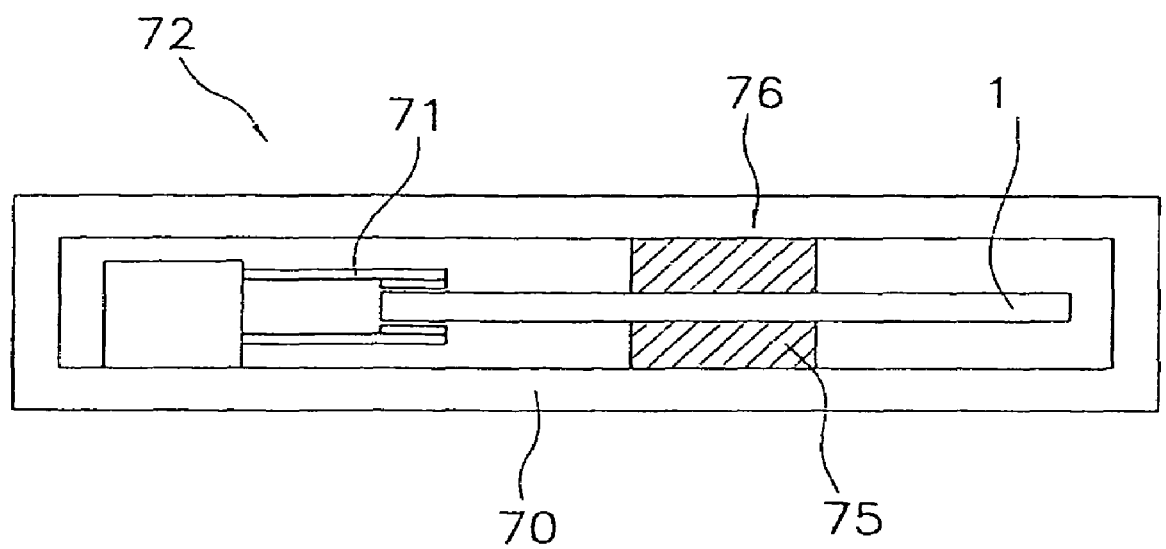
FIG. 16 is a diagram of the disk driving apparatus pertaining to the present invention.
Figure 17:
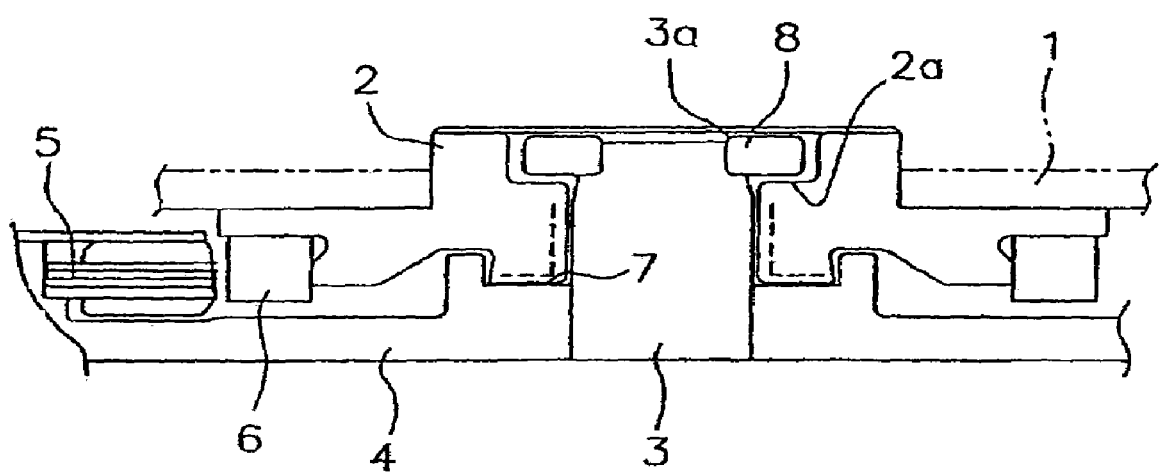
FIG. 17 is a cross section of a motor that makes use of a proposed hydrodynamic bearing device.
Figure 18:
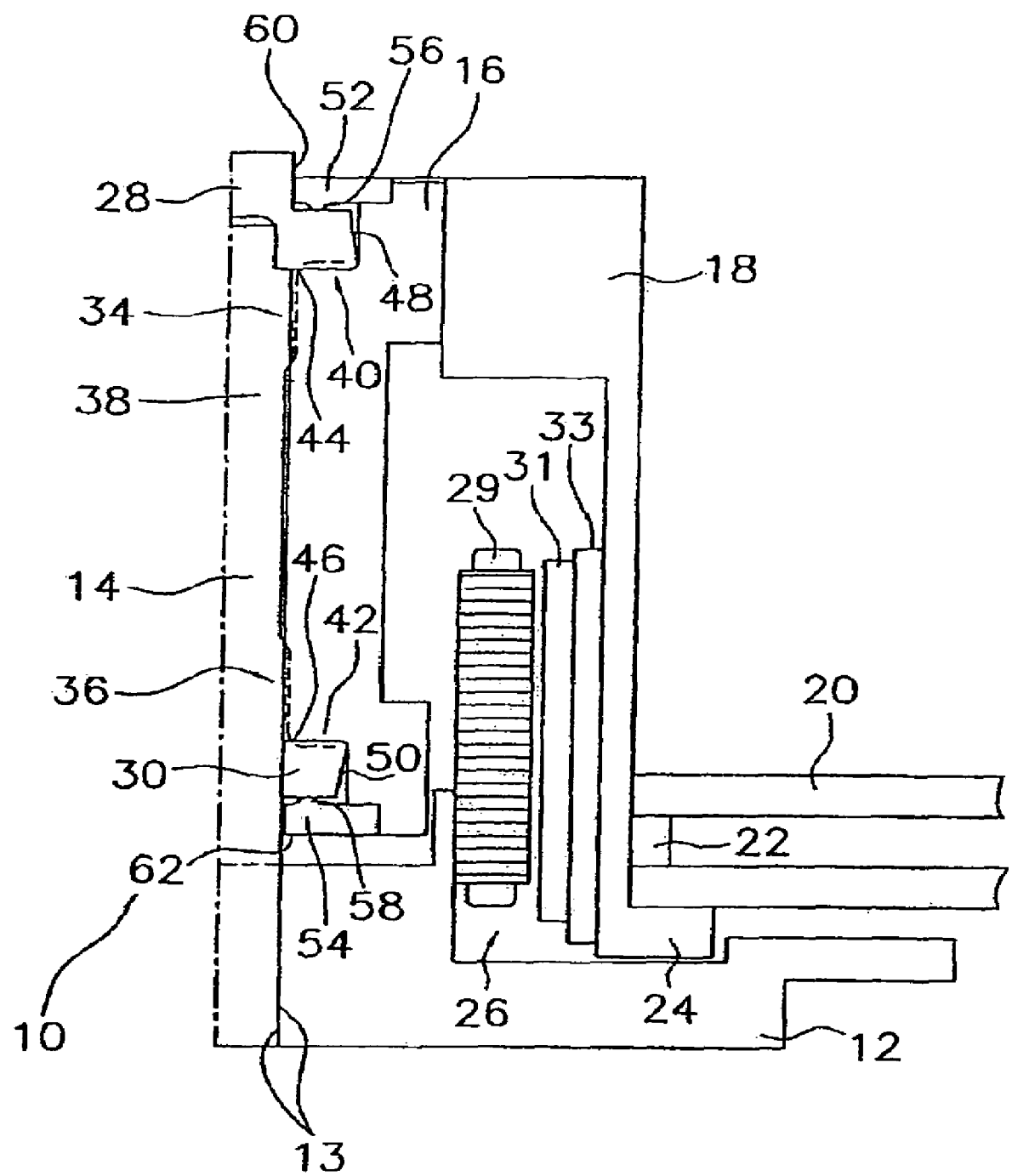
FIG. 18 is a cross section of a motor that makes use of a proposed hydrodynamic bearing device.

A description of a disk driving apparatus (recording and reproduction apparatus) equipped with the hydrodynamic bearing device and disk driving apparatus motor described in the first and second embodiments will be given here through reference to FIG. 16. A disk driving apparatus 72 comprises a disk driving apparatus motor (motor 76) that makes use of the hydrodynamic bearing device described in the first and second embodiments (hydrodynamic bearing device 75), with this motor installed in a housing 70, and a recording head 71 is used to reproduce information recorded on a disk 1, or to record information to the disk 1.

Industrial Applicability

The hydrodynamic bearing device pertaining to the present invention affords reductions in size, weight, and thickness, and is therefore useful in devices that make use of these hydrodynamic bearing devices.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A hydrodynamic bearing device, comprising:
   a stationary shaft;
   a thrust flange that is larger in diameter than the stationary shaft and is provided near one end of the stationary shaft;
   a sleeve attached so as to be rotatable with respect to the stationary shaft and the thrust flange, the sleeve having an inner peripheral face opposite an outer peripheral face of the stationary shaft in a radial direction with a first gap therebetween, and a first axial direction face opposite a face of the thrust flange in an axial direction with a second gap therebetween;
   a sealing plate provided so as to be capable of rotating integrally with the sleeve, the sealing plate provided opposite a second axial direction face of the sleeve in the axial direction with a third gap therebetween, the second axial direction face of the sleeve being located on an opposite side of the sleeve from the first axial direction face of the sleeve;
   a radial dynamic thrust bearing formed in the first gap; and
   a thrust dynamic bearing formed in the second gap,
   wherein at least one communicating passage is provided for communicating between the second gap and the third gap,
   the first gap, the second gap, the third gap, and the communicating passage hold a lubricating fluid, and
   the radial dynamic bearing and/or the thrust dynamic bearing is formed such that the lubricating fluid in the third gap circulates from an inner peripheral side of the sleeve toward an outer peripheral side of the sleeve.

2. The hydrodynamic bearing device according to claim 1, further comprising a hub that has an inner peripheral face fixed to an outer peripheral face of the sleeve, and has an end fixed to the sealing plate.

3. The hydrodynamic bearing device according to claim 1, further comprising a hub that has an inner peripheral face fixed to an outer peripheral face of the sleeve, and has an end fixed to the sealing plate,
   wherein the outer peripheral face of the sleeve and/or the inner peripheral face of the hub has formed thereon a cutout extending in the axial direction, and
   the communicating passage is formed by the cutout and bounded by the sleeve and the hub.

4. The hydrodynamic bearing device according to claim 1, wherein the outer peripheral face of the shaft and/or the inner peripheral face of the sleeve has formed thereon a radial dynamic pressure groove so that the lubricating fluid in the first gap will circulate from a second gap side toward a third gap side.

5. The hydrodynamic bearing device according to claim 4, wherein the radial dynamic pressure generation groove has an asymmetric herringbone shape in which a groove length on the second gap side is longer than a groove length on the third gap side.

6. The hydrodynamic bearing device according to claim 1, wherein the face of the thrust flange and/or the first axial direction face of the sleeve has formed thereon a thrust dynamic pressure generation groove so that the lubricating fluid in the second gap will circulate from an outer peripheral side of the second gap toward an inner peripheral side of the second gap.

7. The hydrodynamic bearing device according to claim 6, wherein the thrust dynamic pressure generation groove has a spiral shape.

8. The hydrodynamic bearing device according to claim 6, wherein the thrust dynamic pressure generation groove has an asymmetric herringbone shape in which a groove length on the outer peripheral side is longer than a groove length on the inner peripheral side.

9. A hydrodynamic bearing device comprising:
   a shaft;
   a thrust flange that is larger in diameter than the shaft and is provided near one end of the shaft;
   a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;
   a sealing plate provided so as to be capable of rotating integrally with the sleeve, the sealing plate provided opposite a second axial direction face of the sleeve in the axial direction with a third gap therebetween, the second axial direction face of the sleeve being located on an opposite side of the sleeve from the first axial direction face of the sleeve;
   a radial dynamic bearing formed in the first gap; and
   a thrust dynamic bearing formed in the second gap,
   wherein at least one communicating passage is provided for communicating between the second gap and the third gap,
   the first gap, the second gap, the third gap, and the communicating passage hold a lubricating fluid,
   the radial dynamic bearing and/or the thrust dynamic bearing is formed such that the lubricating fluid in the third gap circulates from an inner peripheral side of the sleeve toward an outer peripheral side of the sleeve, and
   the outer peripheral face of the shaft and/or the inner peripheral face of the sleeve includes an inclined face that is inclined such that a size of the first gap in the radial direction increases from a second gap side toward a third gap side.

10. A hydrodynamic bearing device comprising:
    a shaft;
    a thrust flange that is larger in diameter than the shaft and is provided near one end of the shaft;
    a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;
    a sealing plate provided so as to be capable of rotating integrally with the sleeve, the sealing plate provided opposite a second axial direction face of the sleeve in the axial direction with a third gap therebetween, the second axial direction face of the sleeve being located on an opposite side of the sleeve from the first axial direction face of the sleeve;
    a radial dynamic bearing formed in the first gap; and
    a thrust dynamic bearing formed in the second gap,
    wherein at least one communicating passage is provided for communicating between the second gap and the third gap,
    the first gap, the second gap, the third gap, and the communicating passage hold a lubricating fluid,
    the radial dynamic bearing and/or the thrust dynamic bearing is formed such that the lubricating fluid in the third gap circulates from an inner peripheral side of the sleeve toward an outer peripheral side of the sleeve, the face of the thrust flange and/or the first axial direction face of the sleeve has formed thereon a thrust dynamic pressure generation groove so that the lubricating fluid in the second gap will circulate from an outer peripheral side of the second gap toward an inner peripheral side of the second gap, and the communicating passage opens into the second gap at a location that overlaps at least part of a region where the thrust dynamic pressure generation groove is formed.

11. A hydrodynamic bearing device, comprising:
a shaft;
a thrust flange that is larger in diameter than the shaft and is provided near one end of the shaft;
a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;
a radial dynamic bearing formed in the first gap; and
a thrust dynamic bearing formed in the second gap,
wherein at least one communicating passage is provided for communicating between two axial direction ends of the sleeve,
the first gap, the second gap, and the communicating passage hold a lubricating fluid,
the radial dynamic bearing and/or the thrust dynamic bearing is formed such that the lubricating fluid circulates from the second gap toward the first gap, and
the communicating passage opens into the second gap at a location that overlaps at least part of a region where a thrust dynamic pressure generation groove is formed in at least one of the first axial direction face of the sleeve and the face of the thrust flange.

12. A motor, comprising:
a shaft;
a thrust flange that is larger in diameter than the shaft and is provided near one end of the shaft;
a base fixed to one end of the shaft;
a sleeve attached so as to be rotatable with respect to the shaft and the thrust flange, the sleeve having an inner peripheral face opposite an outer peripheral face of the shaft in a radial direction with a first gap therebetween, and a first axial direction face opposite a first face of the thrust flange in an axial direction with a second gap therebetween;
a sealing plate provided so as to be capable of rotating integrally with the sleeve, the sealing plate provided opposite a second axial direction face of the sleeve in the axial direction with a third gap therebetween, the second axial direction face of the sleeve being located on an opposite side of the sleeve from the first axial direction face of the sleeve;
a retaining plate provided so as to be capable of rotating integrally with the sleeve, the retaining plate provided opposite a second face of the thrust flange in the axial direction, the second face of the thrust flange being located on an opposite side of the thrust flange from the first face of the thrust flange;
a rotor substantially fixed to the sleeve;
a stator disposed on the base at a location across from the rotor in the radial direction;
a radial dynamic bearing formed in the first gap; and
a thrust dynamic bearing formed in the second gap, wherein at least one communicating passage is provided for communicating between the second gap and the third gap, the first gap, the second gap, the third gap, and the communicating passage hold a lubricating fluid, and the radial dynamic bearing and/or the thrust dynamic bearing is formed such that the lubricating fluid in the third gap circulates from an inner peripheral side of the sleeve toward an outer peripheral side of the sleeve.

13. A motor, comprising:
a shaft;
a thrust flange that is larger in diameter than the shaft and is provided near one end of the shaft;
a base fixed to one end of the shaft;
a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;
a rotor substantially fixed to the sleeve;
a stator disposed on the base at a location across from the rotor in the radial direction;
a radial dynamic bearing formed in the first gap; and
a thrust dynamic bearing formed in the second gap,
wherein at least one communicating passage is provided for communicating between two axial direction ends of the sleeve,
the first gap, the second gap, and the communicating passage hold a lubricating fluid,
the radial dynamic bearing and/or the thrust dynamic bearing is formed such that the lubricating fluid circulates from the second gap toward the first gap, and
the communicating passage opens into the second gap at a location that overlaps at least part of a region where a thrust dynamic pressure generation groove is formed in at least one of the first axial direction face of the sleeve and the face of the thrust flange.

14. A disk driving apparatus, comprising:
a shaft;
a thrust flange that is larger in diameter than the shaft and is provided near one end of the shaft;
a base fixed to one end of the shaft;
a sleeve attached so as to be rotatable with respect to the shaft and the thrust flange, the sleeve having an inner peripheral face opposite an outer peripheral face of the shaft in a radial direction with a first gap therebetween, and a first axial direction face opposite a first face of the thrust flange in an axial direction with a second gap therebetween;
a rotor hub fixed to the outer peripheral face of the sleeve, on which a disk-shaped recording medium is mounted;
a sealing plate provided to the hub, the sealing plate provided across from a second axial direction face of the sleeve in the axial direction with a third gap therebetween, the second axial direction face of the sleeve being located on an opposite side of the sleeve from the first axial direction face;
a retaining plate provided to the hub, opposite a second face of the thrust flange in the axial direction, the second face of the thrust flange being located on an opposite side of the thrust flange from the first face of the thrust flange;
a rotor magnet fixed to the rotor hub;
a stator disposed on the base at a location across from the rotor magnet in the radial direction;
a radial dynamic bearing formed in the first gap; and a thrust dynamic bearing formed in the second gap, wherein at least one communicating passage is provided for communicating between the second gap and the third gap, the first gap, the second gap, the third gap, and the communicating passage hold a lubricating fluid, and the radial dynamic bearing and/or the thrust dynamic bearing is formed such that the lubricating fluid in the third gap circulates from an inner peripheral side of the sleeve toward an outer peripheral side of the sleeve.

15. A disk driving apparatus, comprising:

a shaft;

a thrust flange that is larger in diameter than the shaft and is provided near one end of the shaft;

a base fixed to one end of the shaft;

a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;

a rotor hub fixed to the outer peripheral face of the sleeve, on which a disk-shaped recording medium is mounted;

a rotor magnet fixed to the rotor hub;

a stator disposed on the base at a location across from the rotor magnet in the radial direction;

a radial dynamic bearing formed in the first gap; and a thrust dynamic bearing formed in the second gap, wherein at least one communicating passage is provided for communicating between two axial direction ends of the sleeve, the first gap, the second gap, and the communicating passage hold a lubricating fluid, the radial dynamic bearing and/or the thrust dynamic bearing is formed such that the lubricating fluid circulates from the second gap toward the first gap, and the communicating passage opens into the second gap at a location that overlaps at least part of a region where a thrust dynamic pressure generation groove is formed in at least one of the first axial direction face of the sleeve and the face of the thrust flange.

16. A hydrodynamic bearing device comprising:

a shaft;

a thrust flange that is larger in diameter than the shaft and is provided near one end of the shaft;

a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;

a radial dynamic bearing formed in the first gap; and a thrust dynamic bearing formed in the second gap, wherein at least one communicating passage is provided for communicating between two axial direction ends of the sleeve, the first gap, the second gap, and the communicating passage hold a lubricating fluid, the radial dynamic bearing and/or the thrust dynamic bearing is formed such that the lubricating fluid circulates from the first gap toward the second gap, and the communicating passage opens into the second gap at a location that overlaps at least part of a region where a thrust dynamic pressure generation groove is formed in at least one of the first axial direction face of the sleeve and the face of the thrust flange.

17. A motor comprising:

a shaft;

a thrust flange that is larger in diameter than the shaft and is provided near one end of the shaft;

a base fixed to one end of the shaft;

a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;

a sealing plate provided to the hub, the sealing plate provided opposite a second axial direction face of the sleeve in the axial direction with a third gap therebetween, the second axial direction face of the sleeve being located on an opposite side of the sleeve from the first axial direction face;

a rotor substantially fixed to the sleeve;

a stator disposed on the base at a location across from the rotor in the radial direction;

a radial dynamic bearing formed in the first gap; and a thrust dynamic bearing formed in the second gap, wherein at least one communicating passage is provided for communicating between the second gap and the third gap, the first gap, the second gap, the third gap, and the communicating passage hold a lubricating fluid, the radial dynamic bearing and/or the thrust dynamic bearing is formed such that the lubricating fluid circulates from the first gap toward the second gap, and the communicating passage opens into the second gap at a location that overlaps at least part of a region where a thrust dynamic pressure generation groove is formed in at least one of the first axial direction face of the sleeve and the face of the thrust flange.

18. A disk driving apparatus comprising:

a shaft;

a thrust flange that is larger in diameter than the shaft and is provided near one end of the shaft;

a base fixed to one end of the shaft;

a sleeve attached so as to be rotatable with respect to the shaft and the thrust flange, the sleeve having an inner peripheral face opposite an outer peripheral face of the shaft in a radial direction with a first gap therebetween, and a first axial direction face opposite a face of the thrust flange in an axial direction with a second gap therebetween;

a rotor hub fixed to the outer peripheral face of the sleeve, on which a disk-shaped recording medium is mounted;

a rotor magnet fixed to the rotor hub;

a stator disposed on the base at a location across from the rotor magnet in the radial direction;

a radial dynamic bearing formed in the first gap; and a thrust dynamic bearing formed in the second gap, wherein at least one communicating passage is provided for communicating between two axial direction ends of the sleeve, the first gap, the second gap, and the communicating passage hold a lubricating fluid,
the radial dynamic bearing and/or the thrust dynamic bearing is formed such that the lubricating fluid circulates from the first gap toward the second gap, and
the communicating passage opens into the second gap at a location that overlaps at least part of a region where a thrust dynamic pressure generation groove is formed in at least one of the first axial direction face of the sleeve and the face of the thrust flange.

* * * * *